United States Patent
Lee

(10) Patent No.: US 10,264,248 B2
(45) Date of Patent: Apr. 16, 2019

(54) DISPLAY APPARATUS, VEHICLE HAVING THE SAME AND METHOD FOR CONTROLLING THE SAME

(71) Applicants: Hyundai Motor Company, Seoul (KR); Kia Motors Corporation, Seoul (KR)

(72) Inventor: Sung Woo Lee, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/707,955

(22) Filed: Sep. 18, 2017

(65) Prior Publication Data
US 2018/0176546 A1 Jun. 21, 2018

(30) Foreign Application Priority Data
Dec. 16, 2016 (KR) .......................... 10-2016-0172159

(51) Int. Cl.
| | |
|---|---|
| F21V 7/04 | (2006.01) |
| H04N 13/368 | (2018.01) |
| G02B 27/22 | (2018.01) |
| H04N 13/32 | (2018.01) |
| G02F 1/13 | (2006.01) |
| F21V 8/00 | (2006.01) |
| H04N 13/30 | (2018.01) |

(52) U.S. Cl.
CPC ......... *H04N 13/368* (2018.05); *G02B 6/0038* (2013.01); *G02B 27/2235* (2013.01); *G02F 1/1323* (2013.01); *H04N 13/32* (2018.05); *G02B 6/0068* (2013.01); *H04N 2013/403* (2018.05)

(58) Field of Classification Search
CPC .......................... H04N 13/368; G02B 27/2235
USPC ......................................................... 362/615
See application file for complete search history.

(56) References Cited

U.S. PATENT DOCUMENTS

| | | | | |
|---|---|---|---|---|
| 2016/0238773 | A1* | 8/2016 | Shei | ........................ G02B 6/005 |
| 2018/0056878 | A1* | 3/2018 | Weller | ...................... B60R 1/02 |

FOREIGN PATENT DOCUMENTS

| | | |
|---|---|---|
| JP | 2012-209832 A | 10/2012 |
| KR | 10-2011-0115806 A | 10/2011 |
| KR | 10-2013-0055260 A | 5/2013 |
| KR | 10-2014-0074022 A | 6/2014 |
| KR | 10-2015-0038828 A | 4/2015 |

* cited by examiner

*Primary Examiner* — Karl D Frech
(74) *Attorney, Agent, or Firm* — Morgan, Lewis & Bockius LLP

(57) ABSTRACT

A display apparatus configured for displaying different images at the same time, a vehicle having the same, and a method for controlling the same, may include a backlight device; and a display panel separate from the backlight device and configured to output an image using light of the backlight device, and the backlight device includes a first light source device configured to emit light; a second light source device separate from the first light source device, and a light guide plate disposed between the first light source device and the second light source device, and provided with a light guide portion configured to guide light in a first optical path when the light of the first light source device is incident and configured to guide light in a second optical path when the light of the second light source device is incident.

21 Claims, 17 Drawing Sheets

< DRIVER >

DISPLAY APPARATUS, VEHICLE HAVING THE SAME AND METHOD FOR CONTROLLING THE SAME

CROSS-REFERENCE(S) TO RELATED APPLICATIONS

The present application claims priority to Korean Patent Application No. 10-2016-0172159, filed on Dec. 16, 2016, the entire contents of which is incorporated herein for all purposes by this reference.

BACKGROUND OF THE INVENTION

Field of the Invention

The present invention relate to a display apparatus configured for displaying different images at the same time, a vehicle having the same, and a method for controlling the same.

Description of Related Art

A vehicle is a driving apparatus configured to move on the road by driving vehicle wheels.

The vehicle includes an internal combustion engine (normal engine vehicle) that burns petroleum fuel, e.g., gasoline and diesel, to generate mechanical power to drive using the mechanical power, and eco-friendly vehicles that drive using electricity to reduce the fuel consumption and hazardous gas emission.

The display device and the sound device are provided in the vehicle for the user's convenience.

The display device displays images for a selected function among radio function, broadcasting, audio function, content function, Internet function, and navigation function, and the sound device outputs the sound about the function that is currently performed.

Since the display device and the sound device output only information related to the selected function, when a plurality of people occupy the vehicle, there may be difficulties in meeting the viewing needs of multiple viewers.

In addition, as for the display device provided in the vehicle, there may be difficulties in outputting a plurality of images about a plurality of functions to the driver even when a single driver is on board.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a display apparatus provided with a light guide plate having a plurality of different optical paths configured to simultaneously output a plurality of different images using the optical path of the light guide plate, a vehicle having the same, and a method for controlling the same.

Various aspects of the present invention are directed to providing a display apparatus configured for pivoting and changing the output direction of the image based on the pivot rotation, a vehicle having the same, and a method for controlling the same.

Additional aspects of the present invention will be set forth in part in the description which follows and, in part, will be obvious from the description, or may be learned by practice of the present invention.

In accordance with an aspect of the present invention, a display apparatus may include a backlight device; and a display panel separate from the backlight device and configured to output an image using light of the backlight device, wherein the backlight device includes a first light source device configured to emit light; a second light source device separated from the first light source device, and a light guide plate disposed between the first light source device and the second light source device, and provided with a light guide portion configured to guide light in a first optical path when the light of the first light source device is incident, and configured to guide light in a second optical path when the light of the second light source device is incident.

The display apparatus may further include a controller configured to alternately turn on the first light source device and the second light source device by a certain period, when a multi-mode is input, and configured to control outputting first view image information when the first light source device is turned on and second view image information when the second light source device is turned on.

The controller synchronizes an operation of the first light source device, an operation of the second light source device, and outputting the first and second view image information.

The display apparatus may further include a case configured to accommodate the backlight device and the display panel; and a rotation element disposed in the case and configured to pivotally rotate the case. When the case is pivotally rotated by the rotation element, the controller controls a coding of the first and second view image information to rotate a first view image and a second view image by 90 degrees.

The controller alternately turns on the first light source device and the second light source device by a certain period, wherein the controller controls outputting the coded first view image information when the first light source device is turned on, and outputting the coded second view image information when the second light source device is turned on.

The display apparatus may further include a detector configured to detect rotation information of the rotation element.

The display apparatus may further include an input configured to receive an input of the rotation information of the rotation element.

The display apparatus may further include an input configured to receive an input of an operation command related to the pivot rotation; and a driver configured to pivotally rotate the case by driving the rotation element based on the command of the controller.

The display apparatus may further include a sound output device configured to output first audio information corresponding to the first view image information and second audio information corresponding to the second view image information.

When a single-mode is input; the controller turns on at least one of the first light source device and the second light source device and controls outputting image information.

The light guide portion includes a plurality of patterns protruded from a surface adjacent to the display panel in the surface of the light guide plate.

The plurality of patterns are disposed with a certain distance on the surface of the light guide plate and protruded with a certain height from the surface of the light guide plate.

In accordance with another aspect of the present invention, a vehicle may include a body; a display apparatus disposed between a driver seat and a passenger seat in the body and provided with a backlight device; and a sound output device provided in the body and configured to output audio information corresponding to an image output on the display apparatus as a sound. The backlight device includes a first light source device configured to emit light; a second light source device separate from the first light source device, and a light guide plate disposed between the first light source device and the second light source device, and provided with a light guide portion configured to guide light in a first view direction when the light of the first light source device is incident and configured to guide light in a second view direction when the light of the second light source device is incident.

The display apparatus further includes a controller configured to alternately turn on the first light source device and the second light source device by a certain period, when a multi-mode is input, and configured to control outputting first view image information when the first light source device is turned on and second view image information when the second light source device is turned on.

The sound output device outputs first audio information corresponding to the first view image information and second audio information corresponding to the second view image information.

When a single-mode is input, the controller turns on at least one of the first light source device and the second light source device and controls outputting image information.

The light guide portion includes a plurality of patterns protruded from a surface adjacent to the display panel in the surface of the light guide plate.

In accordance with another aspect of the present invention, a vehicle may include a body; a cluster disposed in the body; and a display apparatus disposed in the cluster and provided with a backlight device, wherein the backlight device includes a first light source device configured to emit light; a second light source device separate from the first light source device; and a light guide plate disposed between the first light source device and the second light source device, and provided with a light guide portion configured to guide light in a first view direction when the light of the first light source device is incident and configured to guide light in a second view direction when the light of the second light source device is incident.

The display apparatus further includes a controller configured to alternately turn on the first light source device and the second light source device by a certain period, when a multi-mode is input, and configured to control outputting first view image information when the first light source device is turned on and second view image information when the second light source device is turned on.

When a single-mode is input, the controller turns on at least one of the first light source device and the second light source device, and controls outputting image information.

In accordance with another aspect of the present invention, a method for controlling a display apparatus having an edge-type backlight device and a display panel, may include alternately turning on a first light source device and a second light source device of the backlight device by a certain period, when a multi-mode is input; outputting first view image information on the display panel when the first light source device is turned on; and outputting second view image information on the display panel when the second light source device is turned on, wherein turning on the first light source device includes allowing an optical path to be formed in a first view direction by a light guide portion provided in a light guide plate of the backlight device, and turning on the second light source device includes allowing an optical path to be formed in a second view direction by the light guide portion provided in the light guide plate of the backlight device.

The method may further include: controlling a coding of the first and second view image information to rotate a first view image and a second view image by 90 degrees, when the display apparatus pivots.

The method may further include: turning on at least one of the first light source device and the second light source device, when a single-mode is input, and outputting image information on the display panel.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
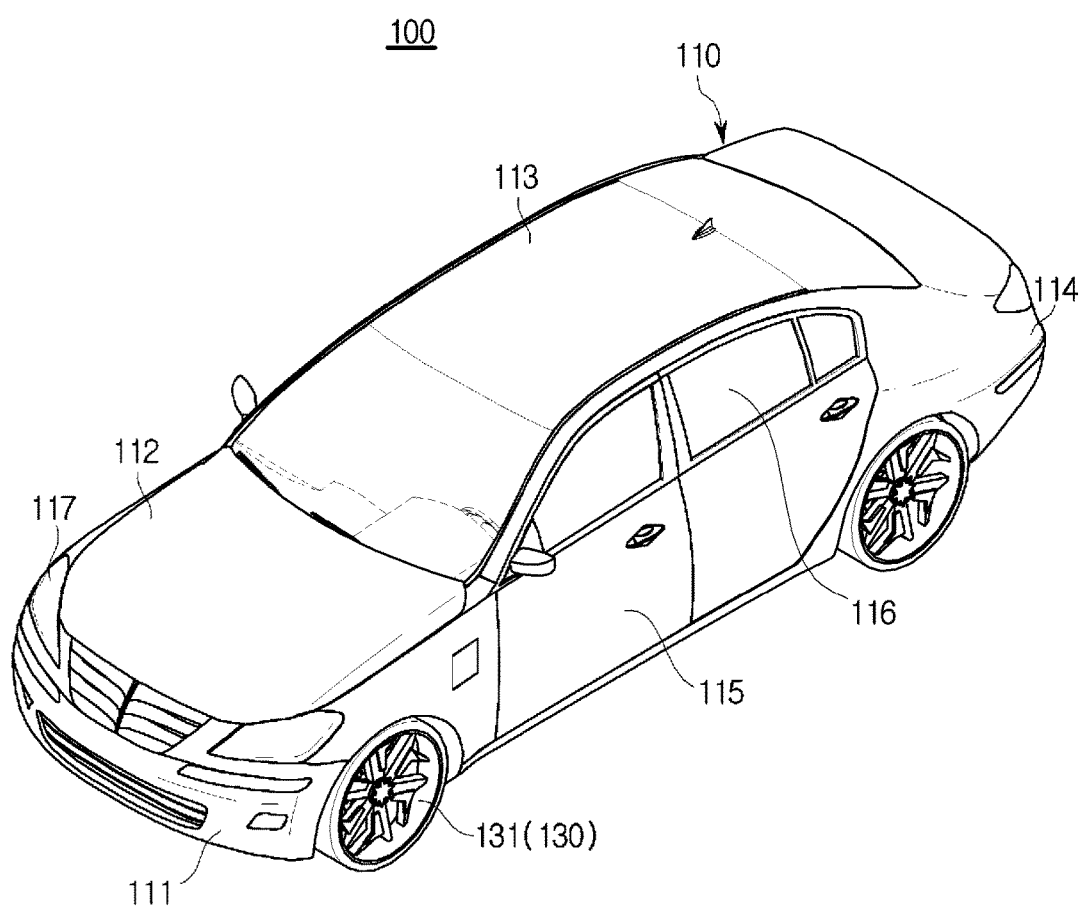
FIG. 1 is an exemplary view illustrating an external of a vehicle in accordance with an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is intended to cover not only the exemplary embodiments, but also various alternatives, modifications, equivalents and other embodiments, which may be included within the spirit and scope of the invention as defined by the appended claims.

Figure 2:
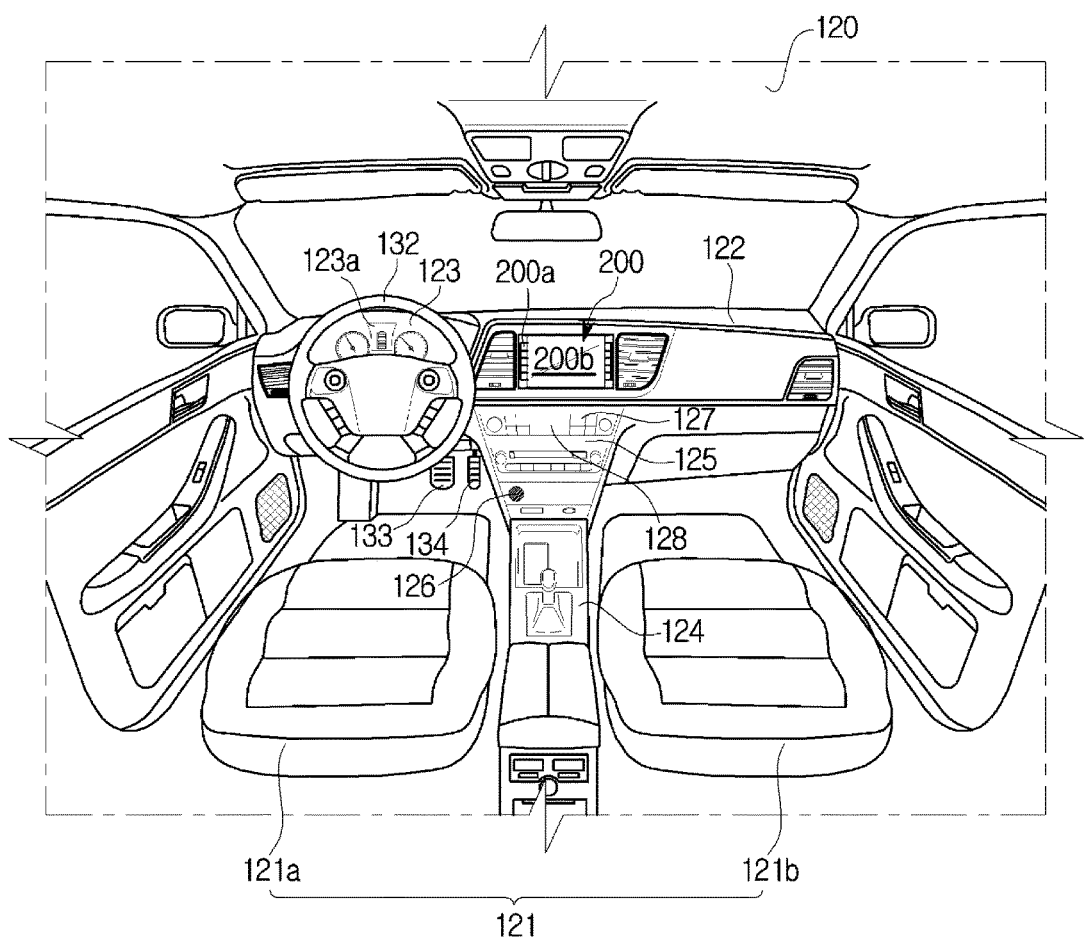
FIG. 2 is an exemplary view illustrating an internal of the vehicle in accordance with an exemplary embodiment of the present invention.

FIG. 1 is an exemplary view illustrating an exterior of a vehicle in accordance with an exemplary embodiment of the present invention, and FIG. 2 is an exemplary view illustrating an internal of the vehicle in accordance with an exemplary embodiment of the present invention.

A vehicle 100 may include a body a having an external 110 and an internal 120, and a chassis 130, which is the rest of the vehicle aside from the body, and in which a mechanical apparatus is disposed for driving.

As illustrated in FIG. 1, an external 110 of the body may include a front panel 111, a bonnet 112, a roof panel 113, a rear panel 114, a front, rear, left, and right door 115, and a window glass 116 disposed in the front, rear, left, and right door 115 configured to be openable.

The external of the body may further include a pillar provided in the boundary between window glasses of the front, rear, left, and right door, a side mirror providing a view of the rear side of the vehicle 100 to a driver, and a lamp 117 allowing the driver to easily check the surroundings while focusing on the front field of view, sending a signal to other vehicles and a pedestrian, and performing a communication function with other vehicles and a pedestrian.

The lamp 117 may be disposed on the front and rear surface of the external of the vehicle and configured to perform a signal and communication function about other vehicles and a pedestrian, as well as a lighting function.

As illustrated in FIG. 2, the internal 120 of the body may include a seat 121 on which a passenger is seated, a dashboard 122, an instrument panel that is a cluster 123, a center fascia 124 in which an operation panel and an outlet of the air conditioning device are disposed, a head device 125 disposed in the center fascia 124 and configured to receive an operation command of the audio device and the air conditioning device, and an ignition device 126 disposed in the center fascia 124 and configured to receive an ignition command, wherein the instrument panel may be disposed on the dashboard and may include a tachometer, speedometer, coolant temperature indicator, fuel indicator, turn signal indicator, high beam indicator light, warning lights, seat belt warning light, trip odometer, odometer, automatic transmission selector lever indicator, door open warning light, oil warning light, and a low fuel warning light.

The seat 121 may include a driver seat 121a on which a driver is seated, and a passenger seat 121b on which a passenger is seated.

The vehicle 100 may further include an input 127 configured to receive an operation command of a variety of functions.

The input 127 may be disposed on the head device 125 and the center fascia 144, and may include at least one physical button including on and off button for the variety of functions, and a button to change a set value of the variety of functions.

The input 127 may further include a jog dial or a touch pad to input a command for moving a cursor and selecting cursor, wherein the cursor is displayed on a display apparatus 200

The jog dial or the touch pad may be disposed in the center fascia 124.

The vehicle 100 may further include a display 128 disposed in the head device 125 and configured to display information related to a function that is currently performed in the vehicle and information input from a user.

The vehicle may further include the display apparatus 200 for the user's convenience.

The display apparatus 200 may be disposed on the dashboard 122 to be hung or embedded in the dashboard 122.

The display apparatus 200 may include a display panel.

The display apparatus 200 may be implemented by a touch screen in which a touch panel is integrally formed with the display panel.

When the display apparatus 200 is implemented by the display panel, it may be possible to receive a selection of a button displayed on the display panel by use of the input 127 provided in the center fascia.

When the display apparatus 200 is implemented by the touch screen, the display apparatus 200 may directly receive a user's operation command via the touch panel.

The display apparatus 200 may output images related to an audio function, a video function, a navigation function, a DMB function and a radio function. A detailed configuration of the display apparatus will be described later.

The chassis 130 of the vehicle may be a frame configured to support the body 110 and 120 and may include vehicle wheels 131 provided in the front, rear, left and right side, a power device configured to apply a torque to the vehicle wheels 131 in the front, rear, left and right side, a steering system, a brake system configured to apply a braking force to the vehicle wheels 131 in the front, rear, left and right side, and a suspension device.

The power device may be configured to generate a torque required for the driving of the vehicle and configured to regulate the generated torque. The power device may include a power generation device and a power transmission device.

The power generation device may include at least one of an engine, a fuel system, a cooling system, a fuel supply device, a battery, a motor, an ignition device (or a generator), and a power converter.

The power transmission device may include at least one of a clutch, a transmission, a longitudinal reduction device, a differential device, and an axle.

The vehicle 100 may include a steering wheel 132 of the steering system configured to regulate a driving direction; a brake pedal 133 pressed by a user according to user's intention of braking; and an accelerator pedal 134 pressed by a user according to user's intention of accelerating (refer to FIG. 2).

Figure 3:
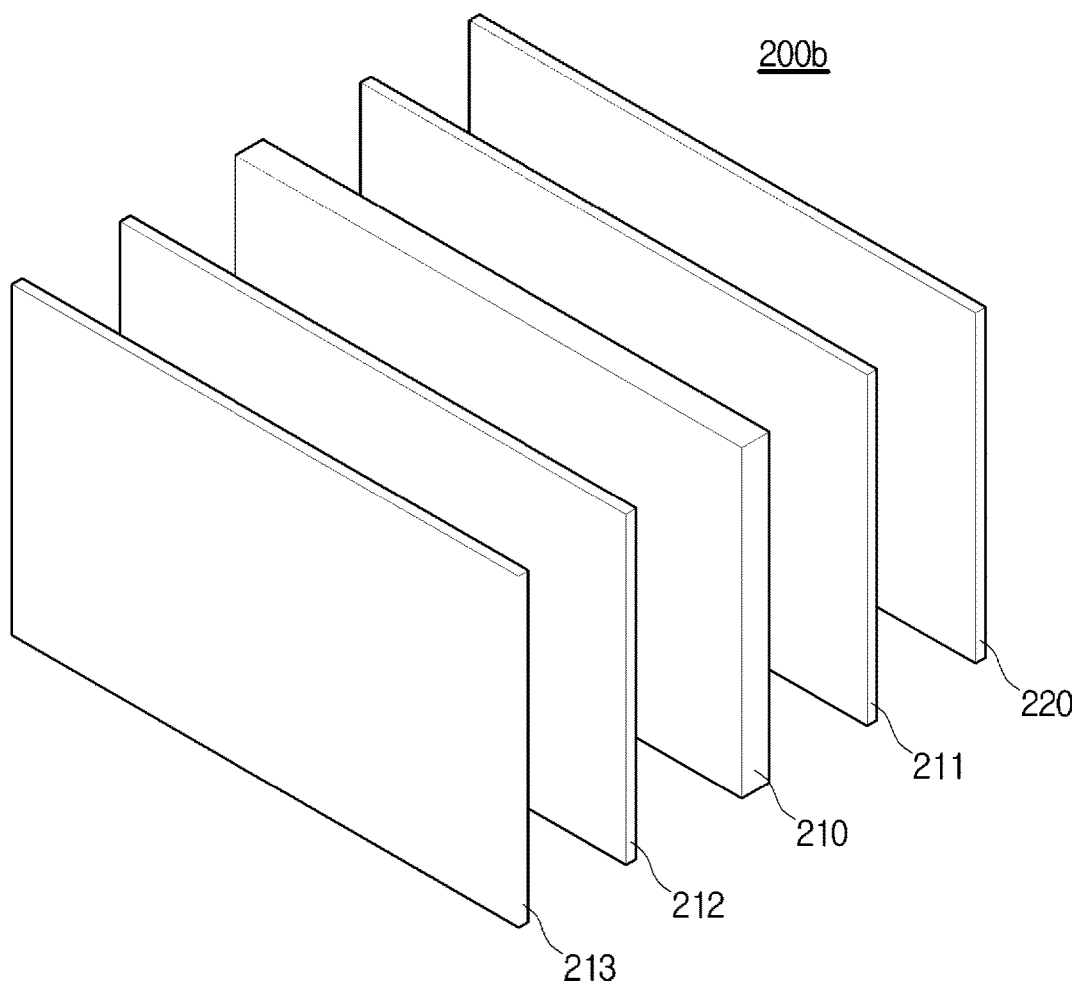
FIG. 3 is an exemplary view illustrating a display apparatus provided in the vehicle in accordance with an exemplary embodiment of the present invention.

FIG. 3 is an exemplary view illustrating a display apparatus provided in the vehicle in accordance with an exemplary embodiment of the present invention, and a description thereof will be described with reference to FIG. 4 and FIG. 5.

The display apparatus 200 may include a case 200*a* forming an external thereof and a display panel 200*b* disposed in the case 200*a* and in which characters, diagrams, and pictures are displayed (refer to FIG. 2).

The display panel 200*b* may be a non-luminous display panel, and include any one of a liquid crystal display (LCD) panel, an organic electroluminescence display panel (ELD), a field emission display panel (FED), and a thin film of the liquid crystal display (TFT-LCD).

An exemplary embodiment of the present invention assumes that the display panel is a liquid crystal display panel.

As illustrated in FIG. 3, the display panel 200*b* may include a liquid crystal panel 210 configured to convert electrical information into image information using the variation of liquid crystal transmittance according to an applied voltage.

The display apparatus may include a backlight device 220 separated from the liquid crystal panel 210 by a certain distance and configured to emit light to the liquid crystal panel 210; a first polarizing panel 211 disposed between the liquid crystal panel 210 and the backlight device 220, and configured to polarize non-polarized light transmitted from the backlight device 220 to a first direction or a second direction; a second polarizing panel 212 disposed in front of the liquid crystal panel 210, and configured to polarize image light output from the liquid crystal panel 210 to a single direction; and a transparent protective panel 213 disposed in front of the second polarizing panel 212 configured to protect the underlying panels.

The liquid crystal panel 210 may display at least one of a single image and multi-images in two dimensions using the light emitted from the backlight device 220.

The liquid crystal panel 210 may include a thin film transistor (hereinafter referred to as TFT) array substrate, a color filter substrate facing the TFT substrate, and a liquid crystal layer disposed between the TFT substrate and the color filter substrate.

The TFT substrate may include data lines and gate lines (or scan lines) which are crossed to each other, thin film transistors formed in an intersection between the data lines and the gate lines, pixel electrodes defined in a matrix form by the data lines and the gate lines, and storage capacitor (Cst) configured to maintain an voltage of liquid crystal cells in the liquid crystal layer.

The color filter substrate may include a black matrix corresponding to the boundaries of pixel regions, a color filter formed of red, green, and blue color patterns which are sequentially corresponding to the pixel regions, and common electrodes.

The common electrode may be formed on a color filter array substrate in a vertical electric field driving method including a Twisted Nematic (TN) mode and a Vertical Alignment (VA) mode. The common electrode may be formed on the TFT array substrate together with the pixel electrode in a horizontal electric field driving method including an In Plane Switching (IPS) mode and a Fringe Field Switching (FFS) mode.

The operation of the liquid crystal panel that is the display panel will be briefly described infra.

When an image signal (data signal) to be displayed on the liquid crystal panel is input to each of data lines, it may be possible to transmit the data signal to pixels electrodes in response to a scan pulse of the gate line of the TFT.

When the data signal is applied to each pixel electrode, an electric field may be formed between each pixel electrode and the common electrodes disposed in the color substrate, i.e., a liquid crystal cell, a liquid crystal array of the liquid crystal cell may be changed by the electric field, and thus the amount of light passing through each color filter of the color filter substrate may vary according to the change in the liquid crystal array of the plurality of liquid crystal cells.

Therefore, the plurality of pixels may display different colors according to the amount of light passing through each color filter of the color filter substrate, and an image may be formed by the combination of the pixels.

Since the liquid crystal panel 210 cannot emit light by liquid crystal itself, it may be possible to appear an image by adjusting the amount of light passing through the color filter by regulating an amount of transmitted light emitted from the backlight device 220.

In a single-mode, the liquid crystal panel 210 may display a single image and in a multi-mode, the liquid crystal panel 210 may display a first view image during a time period for outputting a single frame and then display a second view image during a time period for outputting a next frame.

Polarization axes of the first polarizing panel 211 and the second polarizing panel 212 may be perpendicular to each other.

The transparent protective panel 213 may be a polymer film or substrate formed of a glass substrate, poly carbonate, poly (ethylene terephthalate), or poly acrylic.

Figure 4:
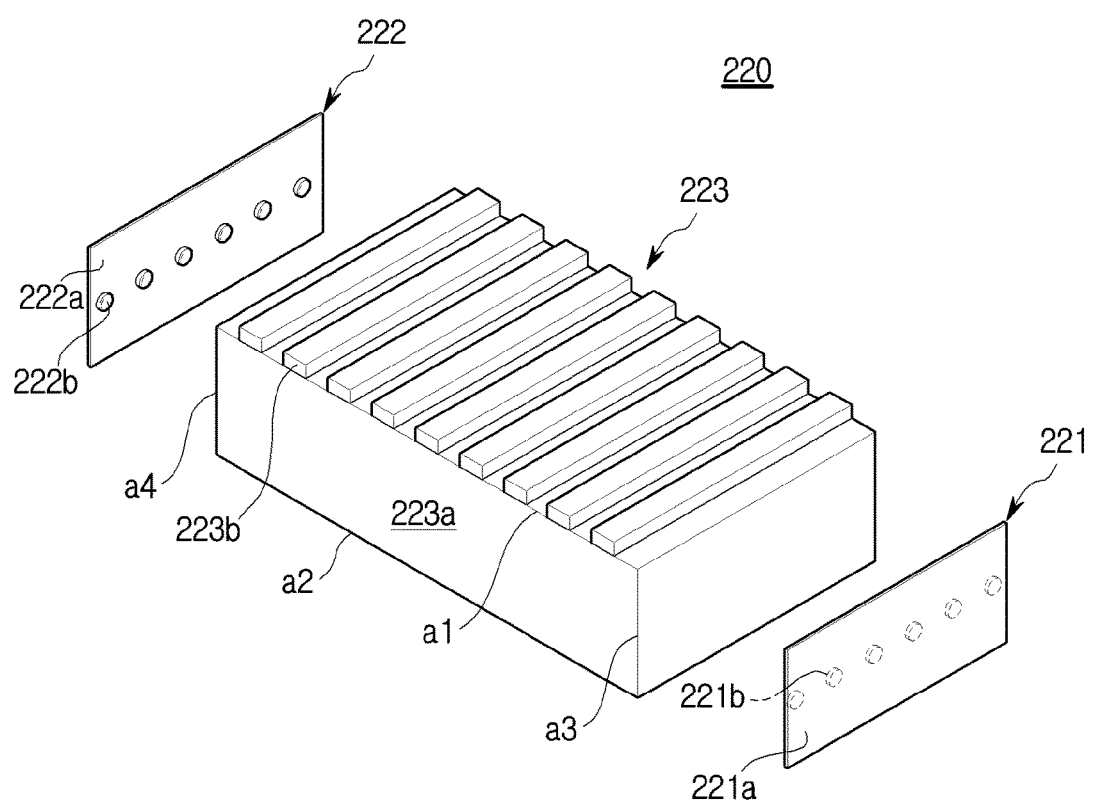
FIGS. 4 and 5 are an exemplary view a backlight device of the display apparatus provided in the vehicle in accordance with an exemplary embodiment of the present invention.

As illustrated in FIG. 4, the backlight device 220 may include a first light source device 221; a second light source device 222 disposed to face the first light source device 221; and a light guide plate 223 disposed between the first light source device 221 and the second light source device 222.

That is, the backlight device 220 may be an edge type in which the first light source device 221 and the second light source device 222 are disposed on opposite sides of the light guide plate 223.

The first light source device 221 may include a first substrate 221*a* in which lines are disposed to send and receive a driving power and an operation signal; a first light source 221*b* disposed in the first substrate 221*a* and configured to emit light with high efficiency and low power consumption, and the second light source device 222 may include a second substrate 222*a* in which lines are disposed to send and receive a driving power and an operation signal;

a second light source 222b disposed in the second substrate 222a and configured to emit light with high efficiency and low power consumption.

The first light source 221b and the second light source 222b may include a plurality of light emitting diodes (LEDs).

The light guide plate 223 may be a panel configured to guide incident lights to the liquid crystal panel 210, and may include a layer formed of at least one of silicon (Si), silicon dioxide ($SiO_2$ or silica) or silicon oxynitride (SiON).

The light guide plate 223 may be formed in the flat type using plastic material, e.g., polymethylmethacrylate (PMMA), which is an acryl-based transparent resin and one of transparent material transmitting light, or a series of polycarbonate.

When transmitting the light, the light guide plate 223 may lead to light diffusion, due to the transparency of the material, weather resistance, and the coloring property.

The light guide plate 223 may include a substrate 223a and a light guide portion 223b disposed in the substrate 223a and protruding from a surface of the substrate 223a.

The substrate 223a may include a first internal reflective surface (a1) adjacent to the liquid crystal panel 210; a second internal reflective surface (a2) disposed to be opposite to the first internal reflective surface (a1); a first incident surface (a3) adjacent to the first light source device 221 and to which light emitted from the first light source device 221 is incident; and a fourth incident surface (a4) adjacent to the second light source device 222 while facing the first incident surface (a3) and to which light emitted from the second light source device 222 is incident.

The first internal reflective surface (a1) of the light guide plate may totally reflect light which is incident by an angle equal to or greater than a certain angle to the inside of the light guide plate 223, and may emit light which is incident by an angle less than the certain angle to the outside.

The light incident by an angle equal to or greater than the certain angle may be light having an incident angle satisfying the total reflection condition in the light guide plate.

The second internal reflective surface (a2) may totally reflect light which is incident by an angle equal to or greater than a certain angle to the inside of the light guide plate 223.

The second internal reflective surface (a2) may be a surface in which entire surfaces are mirror finished surfaces.

The second internal reflective surface (a2) may include a reflection pattern.

The light guide portion 223b may be integrally formed with the first internal reflective surface (a1) of the substrate 223a.

For example, the light guide portion 223b may be a portion of the first internal reflective surface (a1) of the substrate 223a.

In other words, the light guide plate 223 may include the substrate portion 223a having the light guide portion 223b.

The light guide portion 223b may include a pattern protruded on a surface of the first internal reflective surface (a1) of the substrate 223a with a certain distance.

When briefly describing a forming process of the protrusion pattern, the surface of the first internal reflective surface (a1) of the substrate 223a is processed using laser processing, a sand blasting or a coating processing, and thus a certain part of the first internal reflective surface (a1) is recessed with a certain distance so that the rest of the first internal reflective surface (a1) is relatively protruded. In the present time, the protruded portion of the first internal reflective surface (a1) may correspond to the light guide portion 223b.

Alternatively, the light guide portion 223b may include a pattern layer in which a pattern is formed with a certain distance.

The pattern layer may be adhesive to the first internal reflective surface (a1) using the adhesive. The adhesive may form a single adhesive layer.

Each pattern of the pattern layer may have a certain height from the first internal reflective surface (a1). That is, the light guide portion 223b may have a pattern having a certain height on the surface of the first internal reflective surface (a1) of the substrate 223a with a certain distance.

The light guide portion 223b may totally reflect light which is incident by an angle equal to or greater than a certain angle in the light of the first light source device 221, and may transmit light which is incident by an angle less than the certain angle to the outside wherein the light guide portion 223b may transmit the light with a first set angle.

The light guide portion 223b may totally reflect light which is incident by an angle equal to or greater than the certain angle in the light of the second light source device 222, and may transmit light which is incident by an angle less than the certain angle to the outside wherein the light guide portion 223b may transmit the light with a second set angle.

The light guide portion 223b may guide a portion of the light incident on the light guide plate toward a first view direction or a second view direction. That is, the light guide portion 223b may allow a path of light emitted through the light guide plate to be formed.

Particularly, when light of the first light source device is incident the light guide portion 223b may guide the light to a first optical path, and when the light of the second light source device is incident the light guide portion 223b may guide the light to a second optical path.

The first optical path may be a path of the first view direction, and the second optical path may be a path of the second view direction.

Light incident by an angle equal to or greater than the certain angle, in the light of the first and second light source device 221 and 222, may be totally reflected in an area in which the pattern of the light guide portion 223b is not formed among an area of the first internal reflective surface (a1).

The light guide portion 223b may have a cuboid type-straight pattern in which a plurality of cuboid-shaped patterns having a certain height are disposed with a certain distance.

In addition, when the display apparatus pivots, the first optical path may be a path in a third view direction, and the second optical path may be a path in a fourth view direction.

Figure 5:
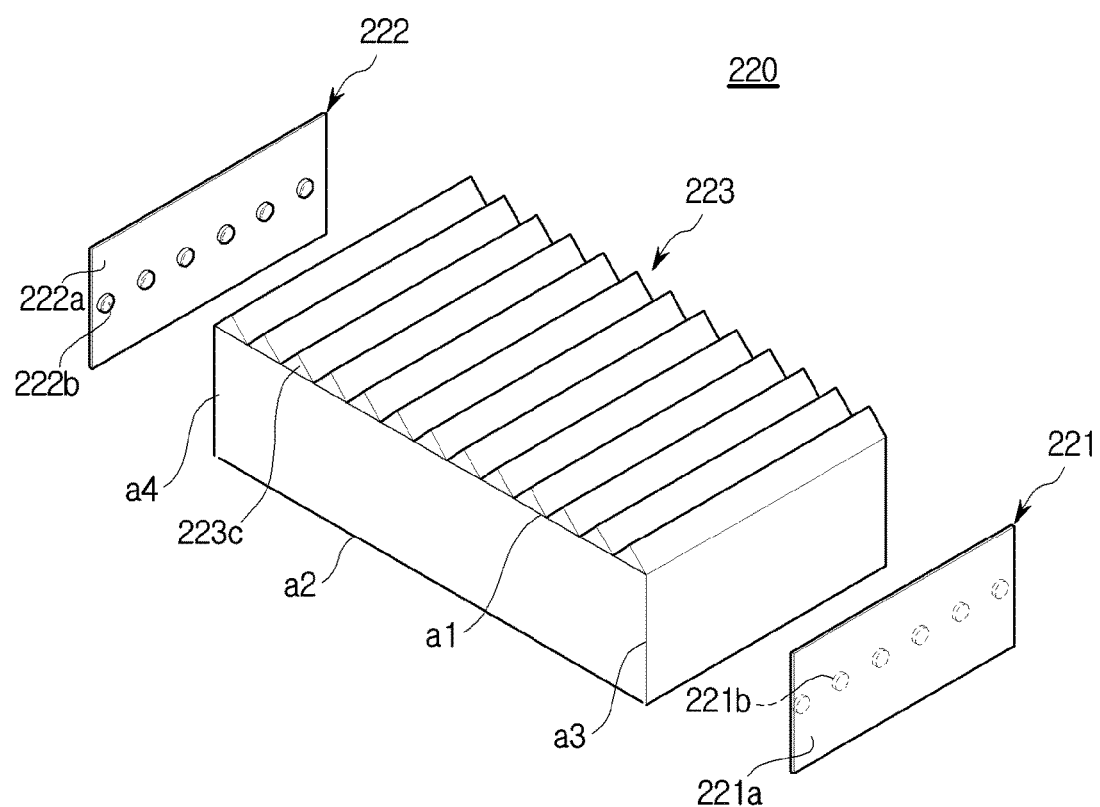

As illustrated in FIG. 5, a light guide portion 223c may be provided integrally with a first internal reflective surface (a1) of a substrate portion 223a.

For example, the light guide portion 223c may be a portion of the first internal reflective surface (a1) of the substrate 223a.

In other words, the light guide plate 223 may include the substrate 223a having the light guide portion 223c.

The light guide portion 223c may include a pattern protruded on a surface of the first internal reflective surface (a1) of the substrate 223a with a certain distance.

Alternatively, the light guide portion 223c may include a pattern layer in which a pattern is formed with a certain distance.

The pattern layer may be adhesive to the first internal reflective surface (a1) using the adhesive. The adhesive may form a single adhesive layer.

Each pattern of the pattern layer may have a certain height from the first internal reflective surface (a1). That is, the light guide portion 223c may have a pattern having a certain height on the surface of the first internal reflective surface (a1) of the substrate 223a with a certain distance.

The light guide portion 223c may totally reflect light which is incident by an angle equal to or greater than a certain angle in the light of the first light source device 221, and may transmit light which is incident by an angle less than the certain angle to the outside wherein the light guide portion 223b may transmit the light with a first set angle.

The light guide portion 223c may totally reflect light which is incident by an angle equal to or greater than a certain angle in the light of the second light source device 222, and may transmit light which is incident with an angle less than the certain angle to the outside wherein the light guide portion 223c may transmit the light with a second set angle.

Light incident by an angle equal to or greater than the certain angle in the light of the first and second light source device 221 and 222 may be totally reflected in an area in which the pattern of the light guide portion 223c is not formed among an area of the first internal reflective surface (a1).

The light guide portion 223c may have a triangular prism type-straight pattern in which a plurality of triangular prism-shaped patterns having a certain height are disposed with a certain distance.

The light guide portion 223c may guide a portion of the light incident on the light guide plate, toward a first view direction or a second view direction. That is, the light guide portion 223c may allow a path of light emitted through the light guide plate to be formed.

Particularly, when light of the first light source device is incident the light guide portion 223c may guide the light to a first optical path, and when the light of the second light source device is incident the light guide portion 223c may guide the light to a second optical path.

The first optical path may be a path in the first view direction, and the second optical path may be a path in the second view direction.

In addition, when the display apparatus pivots, the first optical path may be a path in a third view direction, and the second optical path may be a path in a fourth view direction.

The backlight device 220 may further include a reflection sheet disposed on a rear surface of the light guide plate 223.

The reflection sheet may be disposed between the light guide plate 223 and the case 200a, and configured to reflect light supplied to the light guide plate 223 towards the front surface of the light guide plate 223.

The backlight device 220 may further include one or at least two or more optical sheets.

The optical sheet may be a sheet configured to improve optical properties using a method for the uniformization of the brightness of light output from the first light guide plate 121, and focusing diffused or high luminance light.

The optical sheet may be a sheet configured to improve the light transmission efficiency by selectively transmitting light depending on the wavelength of the light, and by reflecting light having a wavelength different from the selected light to the side of the backlight device.

Figure 6:
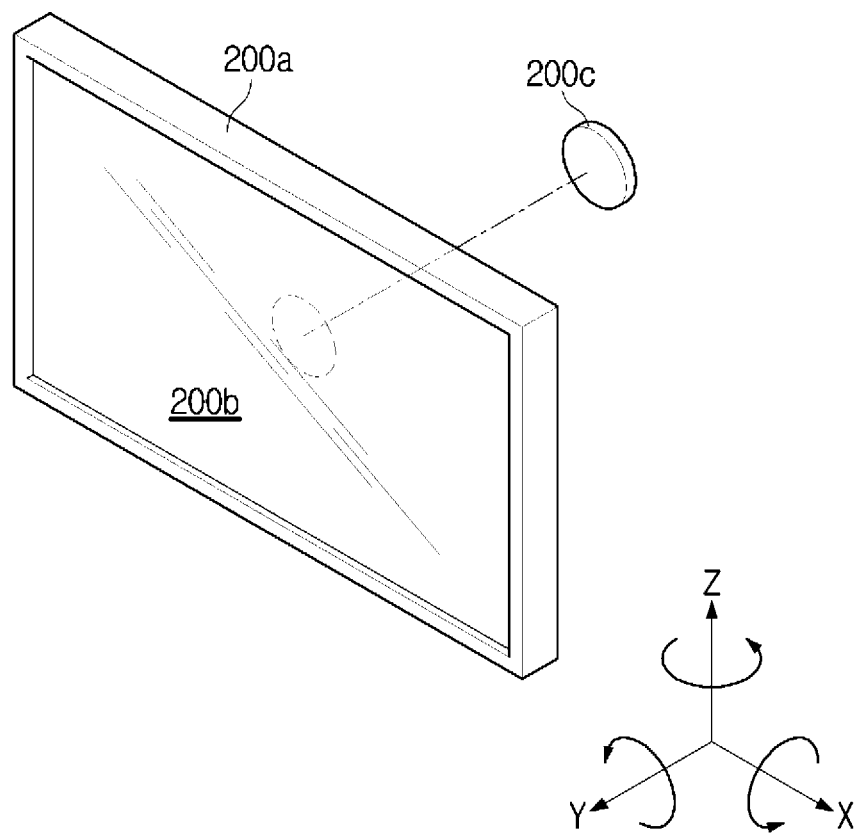
FIG. 6 is an exemplary view rotation of the display apparatus provided in the vehicle in accordance with an exemplary embodiment of the present invention.

As illustrated in FIG. 6, the display apparatus 200 may include a rotation element 200c disposed in the case 200a and configured to rotate the display apparatus 200.

The display apparatus 200 may be rotated in the X, Y, and Z axes by the rotation element 200c.

That is, the display apparatus 200 may perform a tilt performed by vertically rotating up and down in the X-axis, a pivot performed by rotating about the Y-axis, and a pan (referred to as panning shot or swivel) performed by horizontally rotating right and left about the Z-axis.

The display apparatus 200 may further include a second detector 265 configured to detect a rotation state of the rotation element.

The display apparatus may further include a rotary driver (a fourth driver of FIG. 7) configured to automatically rotate the rotation element 200c based on a rotation command that is inputted.

Therefore, the display apparatus 200 may be pan, tilt, and pivot-rotated by a user, and automatically rotated by the rotary driver.

According to an embodiment, the display apparatus 200 is described as the display apparatus disposed in the dashboard of the vehicle 100, but is not limited thereto. The display apparatus 200 may be a display apparatus disposed in the cluster of the vehicle 100 and may be implemented by a display of a mobile device, e.g., a smart phone, a tablet PC, and a laptop, or by a display of a television.

Alternatively, the display apparatus 200 may be implemented by a PC monitor and a guidance display provided in a bus stop, a subway station, a department store.

Figure 7:
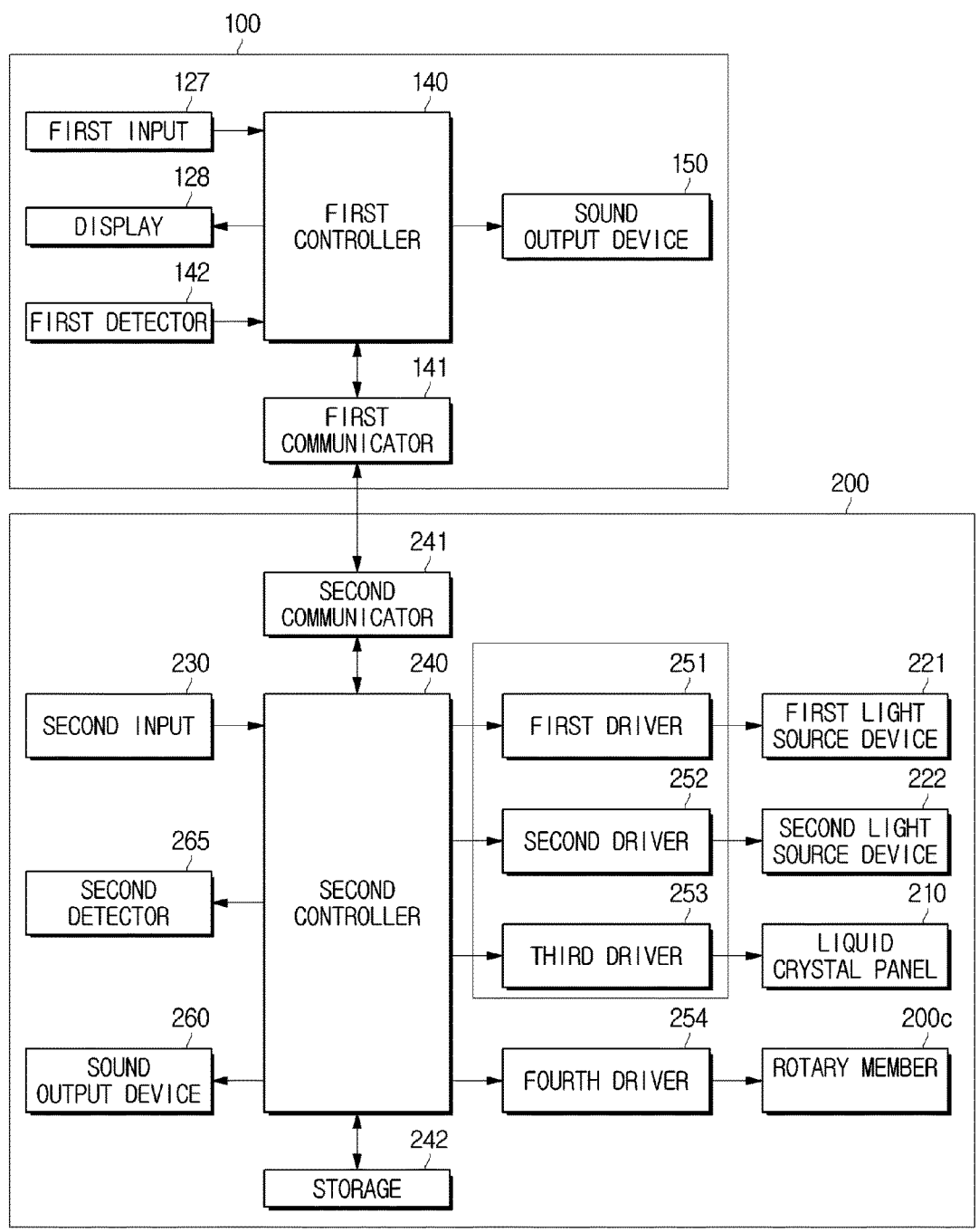
FIG. 7 is a control diagram illustrating the display apparatus provided in the vehicle in accordance with an exemplary embodiment of the present invention.

FIG. 7 is a control diagram illustrating the display apparatus provided in the vehicle in accordance with an exemplary embodiment of the present invention.

The vehicle may include a first input 127, a display 128, a first controller 140, and a first communicator 141.

To distinguish between the component of the vehicle and the component of the display apparatus, wherein the component has the same name, the name of the component of the vehicle may have "first" and the name of the component of the display apparatus may have "second".

The first input 127 may receive a selection of the single-mode and the multi-mode, and receive an input of at least one of the plurality of functions, a radio or broadcast channel, and audio information and content information.

The first input 127 may receive an input of destination information when performing the navigation function.

The first input 127 may receive an input of any one rotation information of pan, tilt and pivot rotation of the display apparatus 200.

The first input 127 may include at least one of button, switch, key, jog dial and touch pad.

The first input 127 may be an input disposed in the head device 125 or an input disposed in the center fascia 124.

The display 128 may display an image display mode that is currently performed, an image display mode that is selected by a user, or output image information that is currently output.

The image information may include broadcast channel information, radio channel information, or content information.

The display 128 may be a display disposed in the head device 125 or a display 123a disposed in the cluster 123.

The first controller 140 may receive operation information input to the first input, control the operation of the display 128 based on the received operation information, and transmit the received operation information to the display apparatus 200.

The operation information may include image display mode information, function information (e.g., navigation function, broadcasting function, radio function, audio function, Internet function and content function), volume information, and pan, tilt, and pivot rotation information.

The operation information may further include information, e.g., playback, pause, stop, next channel shift, and previous channel shift.

The vehicle may receive an input of function information and operation information related to the first view and the second view when the image display mode of the display apparatus is the multi-mode.

The first controller 140 may control the display 123*a* provided in the cluster 123 so that the display 123*a* displays the wheel speed, the acceleration, the fuel amount, and the shift lever position information, which are detected by a first detector 142.

The first detector 142 may include a wheel speed detector, an acceleration detector, a fuel amount detector, and a shift lever position detector, and further include a passenger detector configured to detect a passenger.

For example, the first controller 140 may control displaying of RPM information (i.e., tachometer information), vehicle speed information, fuel amount information, recent mileage information, total mileage information, and shift lever position information.

The first controller 140 may be implemented by a memory configured for storing data about an algorithm or program that is a reproduction of the algorithm for controlling the operation of the internal components of the vehicle, and a process configured for performing the above-described operation using the stored data in the memory. In the present time, the memory and the processor may be implemented as separate chips. Alternatively, the memory and the processor may be implemented on a single chip.

The first communicator 141 may perform a communication between the first controller 140 and the display apparatus 200.

The first communicator 141 may perform a wired or wireless communication.

The first communicator 141 may perform CAN communication, USB communication, Wi-Fi communication, and Bluetooth communication, and further perform broadcasting communications, e.g., DMB, TPEG, SXM, and RDS.

The first communicator 141 may perform 2 generation (2G) communication, e.g., time division multiple access (TDMA) and code division multiple access (CDMA), 3 generation (3G) communication, e.g., wideband code division multiple access (WCDMA), code division multiple access 2000 (CDMA2000), wireless broadband (Wibro) and world interoperability for microwave access (WiMAX), 4 generation (4G) communication, e.g., long term evolution (LTE) and wireless broadband (WiBro) evolution, and 5 generation (5G) communication.

The first communicator 141 may further include a GPS receiver configured to receive signals transmitted from GPS satellites to recognize a current position of the vehicle.

The vehicle 100 may further include a sound output device 150 configured to output audio information, which corresponds to a function that is currently performed in the display apparatus, as a sound.

The sound output device 150 may output audio information, which corresponds to a multi view image when the display apparatus 200 displays a multi view image as a sound, and the sound output device 150 may output audio information having different directivity as a sound.

The sound output device 150 may be a speaker provided in the vehicle.

The sound output device 150 may include a plurality of output devices configured to output audio information, which corresponds to a multi view image when the display apparatus 200 displays a multi view image, as a sound.

The plurality of the output devices may include at least one audio terminal connected to a headset or an earphone.

For example, the sound output device 150 may output audio information corresponding to a single image via the speaker, and audio information corresponding to another image via the headset or earphone connected to the audio terminal.

For another example, the sound output device 150 may output audio information corresponding to a single image via a first audio terminal, and audio information corresponding to the other image via a second audio terminal.

The vehicle may perform the Bluetooth communication. That is, the vehicle may perform the communication with at least one Bluetooth earphone via the Bluetooth communication.

For example, the vehicle may transmit multi audio information corresponding to the multi view image to different Bluetooth earphones via the Bluetooth communication.

For another example, the vehicle may transmit one of multi audio information corresponding to the multi view image to a single Bluetooth earphone via the Bluetooth communication, and output the other audio information via the speaker.

For another example, the vehicle may transmit one of the multi audio information corresponding to the multi view image to a plurality of Bluetooth earphones via the Bluetooth communication, and output the other audio information via the speaker.

The display apparatus may include a second input 230, a second controller 240, a second communication device 241, a storage 242, a driver 250, and a sound output device 260.

The second input 230 may be provided as a button type in a case of the display apparatus.

The second input 230 may include a button configured to receive an input of power on and off operation information and image display mode of the display apparatus.

In addition, the second input 230 may include a button configured to receive operation information corresponding to the first view, and a button configured to receive operation information corresponding to the second view. The button of the first view and the button of the second view may be disposed in different positions.

For example, the button of the first view may be disposed on the left surface of the case, and the button of the second view may be disposed on the right surface of the case.

The second input 230 may receive an input of any one rotation information of pan, tilt, and pivot rotation, and an input of image display mode information, function information (e.g., navigation function, broadcasting function, radio function, audio function, Internet function and content function), volume information, and pan, tilt, and pivot rotation information.

The second input 230 may further receive operation information e.g., playback, pause, stop, next channel shift, and previous channel shift.

The second input 230 may be a touch panel integrally disposed with the display panel.

This second input 230 may receive an input of icon position information displayed on the display panel of the display apparatus.

The icons may include the operation information to be changed.

The display apparatus 200 may perform a communication with a remote controller configured to control outputting of images displayed on the display panel.

That is, the display apparatus may perform the communication with a remote controller and receive operation information transmitted from the remote controller, displaying an image based on the received operation information.

When the multi-mode is input, the second controller 240 may confirm a first function and a second function input to the first input or the second input, and receive the first view image information and the second view image information corresponding to the confirmed first and second function, confirming the received first view image information and second view image information.

The first function may be a function required by a driver and the second function may be a function required by a passenger.

When receiving the first view image information and second view image information, the second controller 240 may receive image information from an external device or image information stored in the storage via the second communicator.

The second controller 240 may check a reference clock signal and synchronize an operation time of the first light source device and second light source device with an output time of the first view image information and second view image information based on the checked reference clock signal.

That is, the second controller 240 may control the ON operation of the first light source device and the OFF operation of the second light source device based on the checked reference clock signal, and when it is determined that a reference time is expired based on the reference clock signal, the second controller 240 may control the OFF operation of the first light source device and the ON operation of the second light source device.

The second controller 240 may control outputting the first view image information while controlling the ON operation of the first light source device, and control outputting the second view image information while controlling the ON operation of the second light source device to allow the first image to be output in the first view direction and allow the second image to be output in the second view direction.

The second controller 240 may output the first view image information and second view image information using a multiplexer and alternately control the ON operation of the first light source device and the second light source device.

The first view direction may be a direction of the driver, i.e., the left direction of the display apparatus with respect to the display apparatus, and the second view direction may be a direction of the passenger, i.e., the right direction of the display apparatus with respect to the display apparatus.

The first function may correspond to the navigation function and the second function may correspond to any one function except for the navigation function.

When the single-mode is input, the second controller 240 may confirm the function input to the first input or the second input, and check image information corresponding to the confirmed function.

The input function may be a function required by a user wherein the user may be the driver or the passenger.

When the single-mode is input in a state in which the passenger is not present, the second controller 240 may check image information corresponding to the confirmed function and control outputting the checked image information.

In the present time, the second controller 240 may control the ON operation of the first light source device and the OFF operation of the second light source device, and control outputting the image information corresponding to the input function.

When the single-mode is input in a state in which the passenger is present, the second controller 240 may check a view mode input to the first input or the second input and determine whether the checked view mode is the first view mode or the second view mode. When it is determined that the view mode is the first view mode, the second controller 240 may control the ON operation of the first light source device and the OFF operation of the second light source device, and control outputting the image information corresponding to the input function.

When it is determined that the view mode is the second view mode, the second controller 240 may control the ON operation of the second light source device and the OFF operation of the first light source device, and control outputting the image information corresponding to the input function.

When controlling the image output as the single-mode, the second controller 240 may control the ON operation of the first light source device and the second light source device, and in the present time, the second controller 240 may reduce the output power of the first and second light source device.

The second controller 240 may recognize whether the passenger boards or not based on the passenger detection information detected by the first detector 142, and also determine whether the passenger boards or not based on the view mode information input to the first input or the second input.

When a pivot rotation button of the first input or the second input is turned on, the second controller 240 may recognize a pose mode of the display apparatus as a portrait mode, and when the pivot rotation button is turned off, the second controller 240 may recognize the pose mode of the display apparatus as a landscape mode. The second controller 240 may transmit operation information to the fourth driver 254 based on the recognized mode and control coding of the image information based on the recognized mode.

When the landscape mode is input in a state in which the view mode is the multi-mode, the second controller 240 may allow the first view image to be displayed in the first view direction by controlling the first light source device and the liquid crystal panel, and allow the second view image to be displayed in the second view direction by controlling the second light source device and the liquid crystal panel.

When the portrait mode is input in a state in which the view mode is the multi-mode, the second controller 240 may perform coding of the first and second view image information so that the first and second images are rotated by 90 degrees, allow the coded first view image to be displayed in the third view direction by controlling the first light source device and the liquid crystal panel, and allow the coded second view image to be displayed in the fourth view direction by controlling the second light source device and the liquid crystal panel.

The third view direction may be a direction in which a user's sight is toward the front, and the fourth view direction may be a direction lower than the third view direction.

When the portrait mode is input in a state in which the view mode is the single-mode, the second controller 240 may perform coding of the image information so that the image is rotated by 90 degrees, and allow the coded view image to be displayed in at least one of the third view direction and the fourth view direction by controlling the ON operation of at least one of the first and second light source device and controlling the liquid crystal panel.

The third view direction and the fourth view direction may be determined by a user's selection.

The second controller 240 may transmit audio information to the first controller of the vehicle so that the sound is output via the speaker provided in the vehicle when communicating with the vehicle.

The second controller 240 may be implemented by a memory storing data about an algorithm or program that is a reproduction of the algorithm for controlling the operation of the internal components of the display apparatus 200, and a processor for performing the above-described operation using the stored data in the memory. In the present time, the memory and the processor may be implemented as separate chips. Alternatively, the memory and the processor may be implemented on a single chip.

The second communicator 241 may perform a communication between the first communicator 141 of the vehicle and a remote controller.

The second communicator 241 may receive operation information input to the first input of the vehicle or operation information input to the remote controller.

The second communicator 241 may perform a communication with an external device, e.g., a server, a storage medium, and a terminal.

The terminal may include a tablet, a smartphone, a laptop, a desktop, and a wearable device, and the storage medium may include a hard disk, and a USB memory.

The second communicator 241 may perform a communication with an earphone configured for performing the Bluetooth communication.

The second communicator 241 may receive a broadcast signal and information related to the broadcasting from an external broadcast server via a broadcast channel. The broadcast channel may include a satellite channel and a terrestrial channel.

The second communicator 241 may perform simultaneous broadcast reception about at least two broadcast channels or receive two or more broadcast signals for switching the broadcast channels.

The second communication device 241 may send and receive a radio signal to and from at least one of a base station, an external terminal, and a server on the mobile communication network that is built according to the technology standard for the mobile communication or the communication method (e.g., Global System for Mobile communication (GSM), Code Division Multi Access (CDMA), Code Division Multi Access 2000 (CDMA2000), Enhanced Voice-Data Optimized or Enhanced Voice-Data Only (EVDO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A).

The radio signal may include information in a variety of forms according to transmitting and receiving voice call signals, video telephone call signals or text and multimedia messages.

The second communication device 241 may perform the wireless Internet communication, e.g., Wireless LAN (WLAN), Wireless-Fidelity (Wi-Fi), Wireless-Fidelity (Wi-Fi) Direct, Digital Living Network Alliance (DLNA), Wireless Broadband (WiBro), World Interoperability for Microwave Access (WiMAX), High Speed Downlink Packet Access (HSDPA), and High Speed Uplink Packet Access (HSUPA).

The second communication device 241 may perform the short range communication, e.g., Bluetooth™, Radio Frequency Identification (RFID), Infrared Data Association (IrDA) communication, Ultra Wideband (UWB), ZigBee, Near Field Communication (NFC), Wireless-Fidelity (Wi-Fi), Wireless-Fidelity (Wi-Fi) Direct, and Wireless Universal Serial Bus (Wireless USB).

The storage 242 may store the map information and the content information.

The storage 242 may store time information to output the reference clock signal and time information to output the first view image and the second view image.

The storage 242 may store the image information to output the first view image and the image information to output the second view image when performing the portrait mode as the multi-mode.

The image information to output the first view image may include vehicle speed information, RPM information, and shift lever position information, and the image information to output the second view image may include fuel quantity information, outdoor temperature information, room temperature information, current time information, recently mileage information, and total mileage information.

The storage 242 may store a first output capacity information of the first light source device and the second light source device during the multi-mode, and a second output capacity information of the first light source device and the second light source device during the single-mode.

The first and second output capacity information may be a current value flowing into the first light source device and the second light source device, and a current value of the first output capacity information may be greater than a current value of the second output capacity information.

Since both of the first light source device and the second light source device are turned on during the single-mode, the amount of light emitted from the backlight may be high. Therefore, during the single-mode, it may be possible to display an image after reducing the total amount of light emitted from the backlight by reducing the output capacity of the first light source device and the second light source device.

The storage 242 may store identification information of the terminal configured for communicating, identification information of the server, and identification information of the vehicle.

The storage 242 may be implemented by at least one storage medium of non-volatile memory, e.g., cache, Read Only Memory (ROM), Programmable ROM (PROM), Erasable Programmable ROM (EPROM), Electrically Erasable Programmable ROM (EEPROM) and Flash memory, or volatile memory, e.g., Random Access Memory (RAM), Hard Disk Drive (HDD), or hard disk drive (HDD) and CD-ROM, but is not limited thereto.

The storage 242 may be a memory that is implemented by a chip separated from the above mentioned processor related to the second controller 240, or may be implemented by a single chip with a processor.

The driver 250 may include a first driver 251 configured to apply the power to the first light source device 221, a second driver 252 configured to apply the power to the second light source device 222, and a third driver 253 configured to allow an image to be displayed on the liquid crystal panel 210.

During the single-mode, the first driver 251 and the second driver 252 may allow the first light source device and the second light source device to be operated at the same time.

During the multi-mode, the first driver 251 and the second driver 252 may allow the first light source device and the second light source device to be alternately operated with a predetermined period.

The third driver 253 may allow an image corresponding to the image information to be displayed on the liquid crystal panel 210 by changing the arrangement of the liquid crystal cell of the liquid crystal panel 210 based on the command of the second controller 240.

During the single-mode, the third driver 253 may allow an image corresponding to the image information to be displayed on the liquid crystal panel 210, and during the multi-mode the third driver 253 may allow the first image corresponding to the first view image information and the second image corresponding to the second view image information to be alternately displayed with a predetermined period.

When alternately displaying the first image and the second image, the third driver 253 may allow the first image and the second image to be alternately displayed based on the operation of the first light source device and the second light source device.

That is, during the multi-mode, the third driver 253 may allow a multi-point image corresponding to a plurality of viewing angle directions to be displayed on the liquid crystal panel 210.

The driver 250 may further include a fourth driver 254 configured to operate the rotation element rotating the display apparatus.

When the rotation information of the display apparatus is input via the first input and the second input, the fourth driver 254 may operate the rotation element 200c based on the input rotation information.

When a pivot rotation button of the first input or the second input is turned on, the fourth driver 254 may allow the display apparatus to be rotated by 90 degrees in the first direction by operating the rotation element 200c, and when the pivot rotation button is turned off, the fourth driver 254 may allow the display apparatus to be rotated by 90 degrees in the second direction by operating the rotation element.

The first direction may be opposite to the second direction.

When the display apparatus 200 displays a multi view image, the sound output device 260 may output audio information corresponding to the multi view image as a sound, and the sound output device 260 may output audio information having different directivity as a sound.

The sound output device 260 may be a speaker provided in the display apparatus 200.

The sound output device 260 may include a plurality of output devices configured to output audio information corresponding to the multi view image as a sound when the display apparatus 200 displays the multi view image.

The plurality of the output devices may include at least one audio terminal to which a wired headset or a wired earphone is connected.

For example, the sound output device 260 may output audio information corresponding to one image, via the speaker, and output audio information corresponding to the other image, via the headset or earphone connected to the audio terminal.

For another example, the sound output device 260 may output audio information corresponding to one image via a first audio terminal, and audio information corresponding to the other image via a second audio terminal.

For another example, the display apparatus may be manually rotated by a user.

When the landscape mode is input via the first input or the second input during the multi-mode, the display apparatus may display the first view image to the left direction and display the second view image to the right direction. When the portrait mode is input the display apparatus may perform a coding configured to rotate the first and second view image to be displayed by 90 degrees, and display the coded first view image to the upper side and display the coded second view image to the lower side.

When the pivot rotation button of the first input or the second input is turned on the display apparatus may recognize the pose mode of the display apparatus as the portrait mode, and when the pivot rotation button is turned off the display apparatus may recognize the pose mode of the display apparatus as the landscape mode.

For another example, the display apparatus may further include a second detector 265 configured to detect whether the display apparatus pivots or not. In the present time, the display apparatus may control the image output based on the information detected by the second detector 265.

That is, during the multi-mode, the display apparatus may detect whether the pivot rotation is performed or not based on the rotation information detected by the second detector 265. When the pivot rotation is not performed, the display apparatus may recognize the pose mode of the display apparatus as the landscape mode and thus the display apparatus may display the first view image to the left direction and display the second view image to the right direction. When the portrait mode is performed due to the pivot rotation, the display apparatus may perform a coding configured to rotate the first and second view image to be displayed by 90 degrees, and display the coded first view image to the upper side and display the coded second view image to the lower side.

When performing the coding configured to rotate the first and second view image by 90 degrees, the display apparatus may adjust the size of the coded first view image and second view image based on the horizontal width and vertical height of the display panel.

Figure 8:
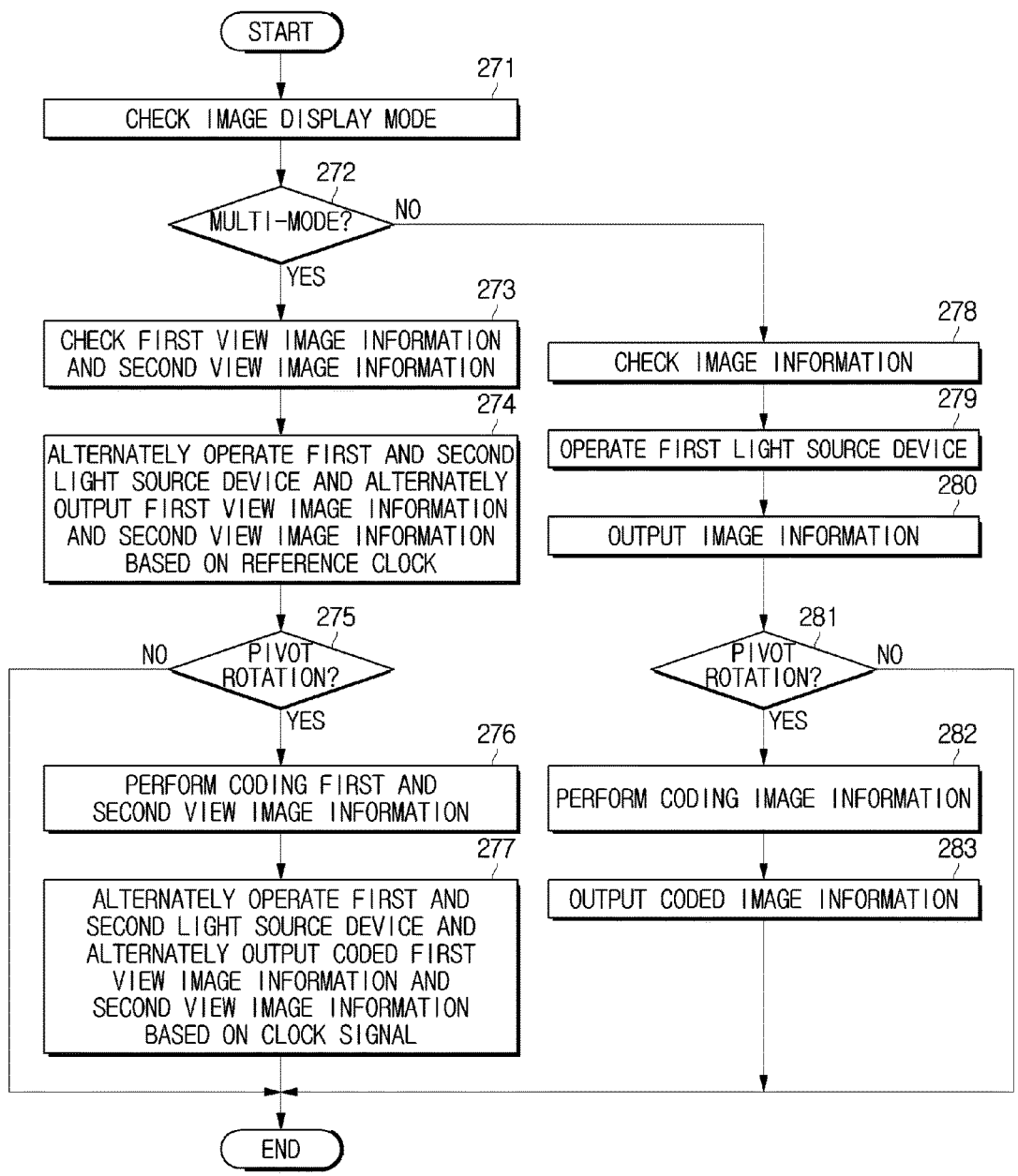
FIG. 8 is a control flow chart illustrating the display apparatus provided in the vehicle in accordance with an exemplary embodiment of the present invention.

FIG. 8 is a control flow chart illustrating the display apparatus provided in the vehicle in accordance with an exemplary embodiment of the present invention, and a description thereof will be described with reference to FIG. 9 to FIG. 16.

Figure 9:
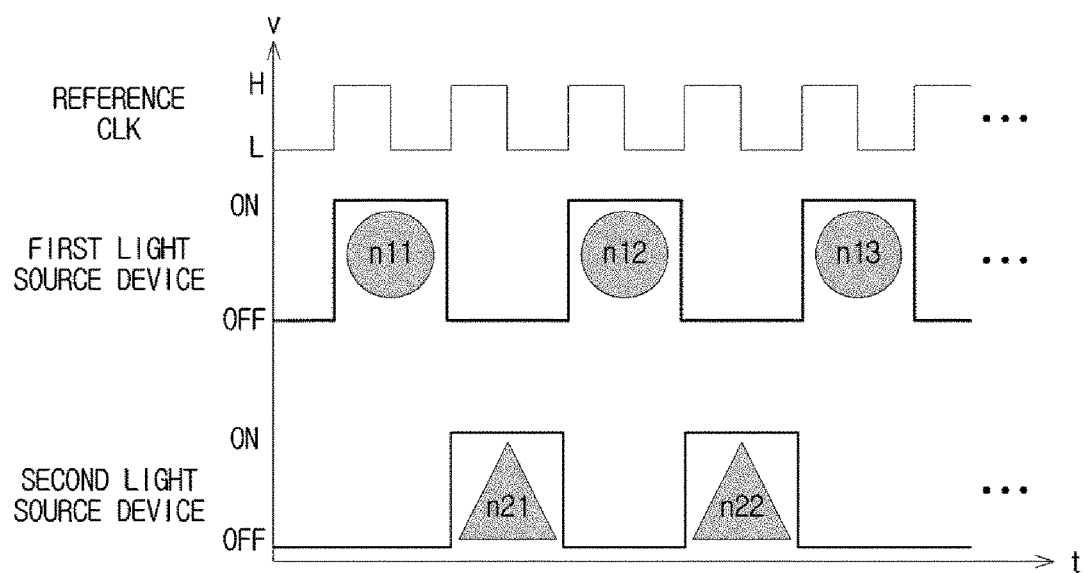
FIG. 9 is an exemplary view illustrating an operation period of the first and second light source device during the multi-mode in the display apparatus in accordance with an exemplary embodiment of the present invention.
Figure 10A:
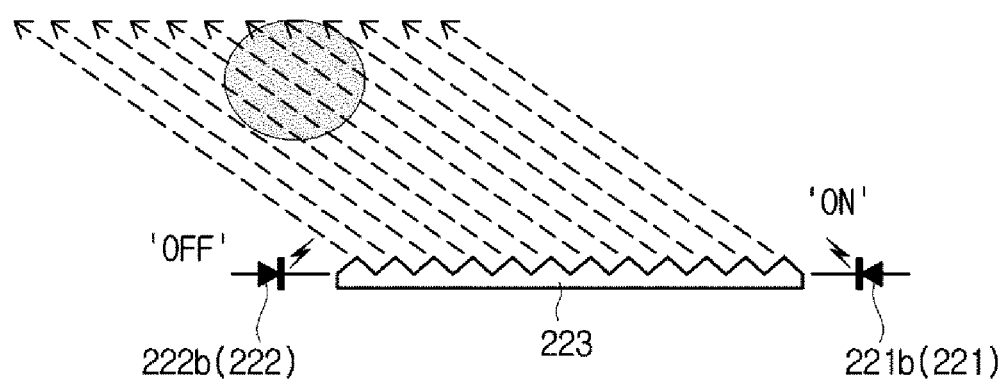
FIG. 10A and FIG. 10B are exemplary views illustrating the light output of the backlight device of the display apparatus in accordance with an exemplary embodiment of the present invention.
Figure 10B:
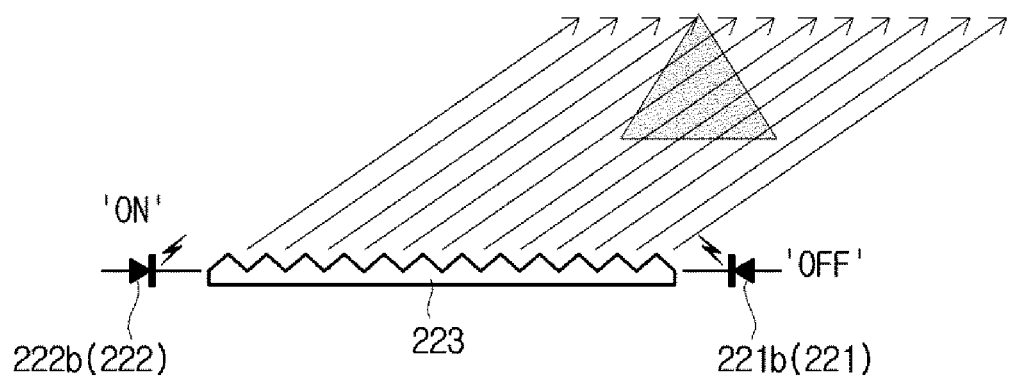
Figure 11:
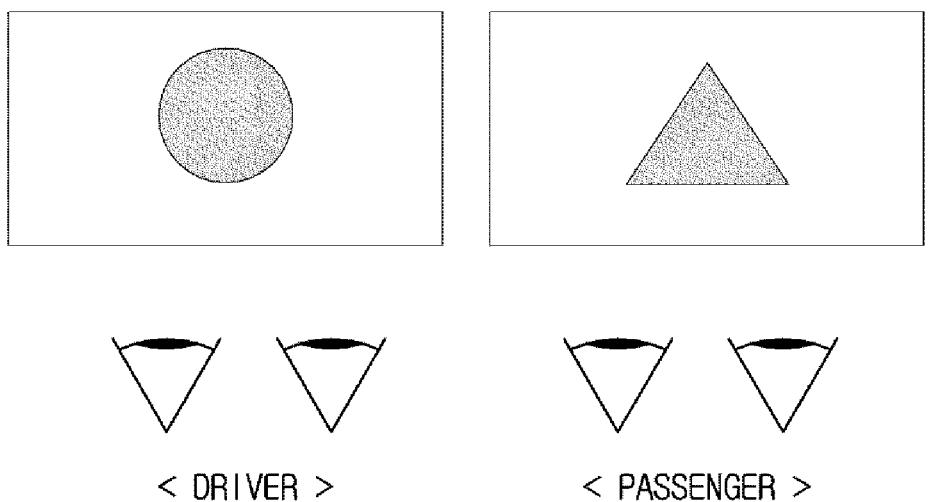
FIG. 11 is an exemplary view illustrating outputting a time division multiple image by the display apparatus in accordance with an exemplary embodiment of the present invention.

FIG. 9 is an exemplary view illustrating an operation period of the first and second light source device during the multi-mode in the display apparatus in accordance with an exemplary embodiment of the present invention, FIG. 10A and FIG. 10B are exemplary views illustrating the light output of the backlight device of the display apparatus in accordance with an exemplary embodiment of the present invention, and FIG. 11 is an exemplary view illustrating outputting a time division multiple image by the display apparatus in accordance with an exemplary embodiment of the present invention.

Figure 12:
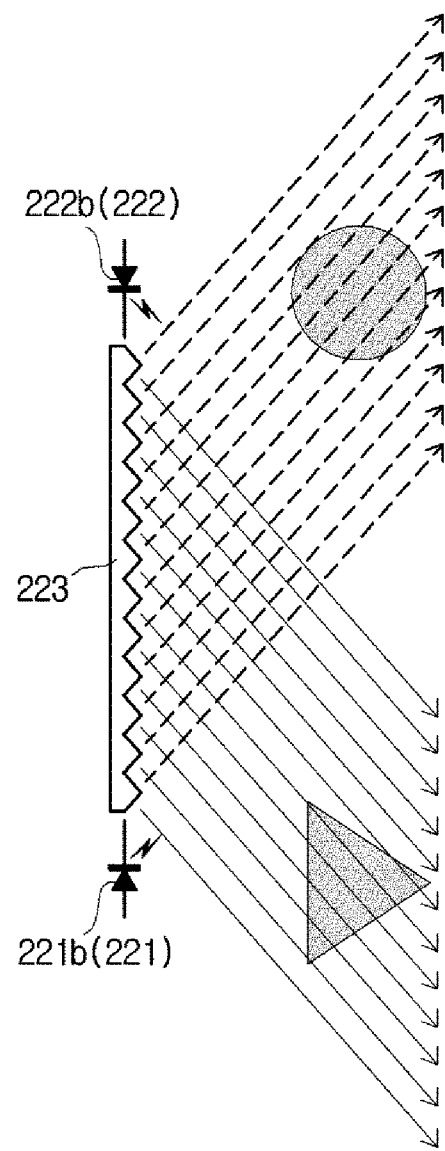
FIG. 12 is an exemplary view illustrating the light output of the backlight device when the display apparatus pivots in accordance with an exemplary embodiment of the present invention.
Figure 13:
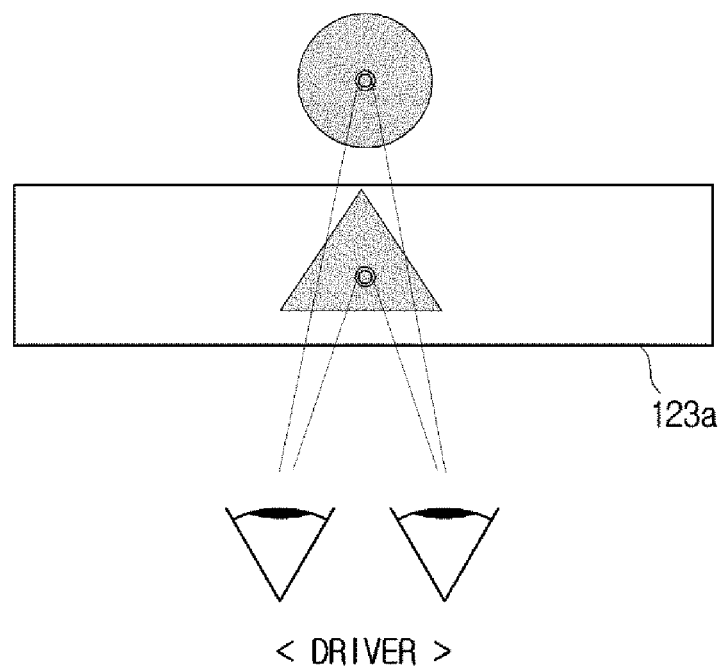
FIG. 13 is an exemplary view illustrating outputting a time division multiple image when the display apparatus pivots in accordance with an exemplary embodiment of the present invention.

FIG. 12 is an exemplary view illustrating the light output of the backlight device when the display apparatus pivots in accordance with an exemplary embodiment of the present invention, and FIG. 13 is an exemplary view illustrating outputting a time division multiple image when the display apparatus pivots in accordance with an exemplary embodiment of the present invention.

Figure 14:
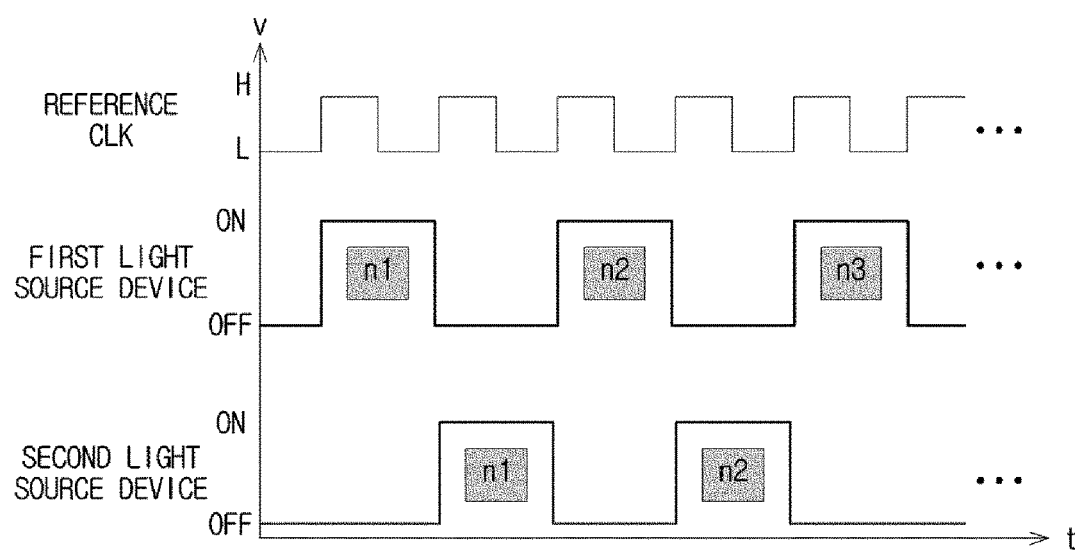
FIG. 14 is an exemplary view illustrating an operation period of the first and second light source device during the single-mode in the display apparatus in accordance with an exemplary embodiment of the present invention.
Figure 15:
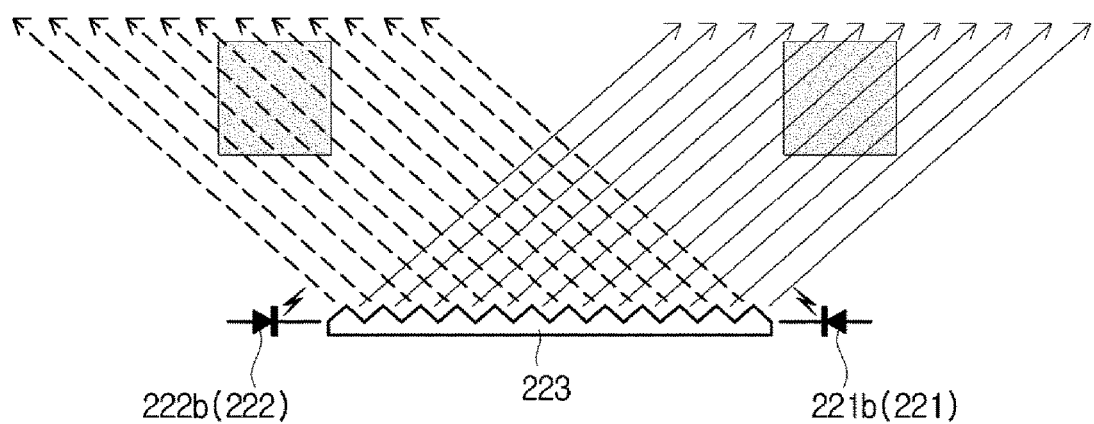
FIG. 15 is an exemplary view illustrating the output image during the single-mode in the display apparatus in accordance with an exemplary embodiment of the present invention.
Figure 16:
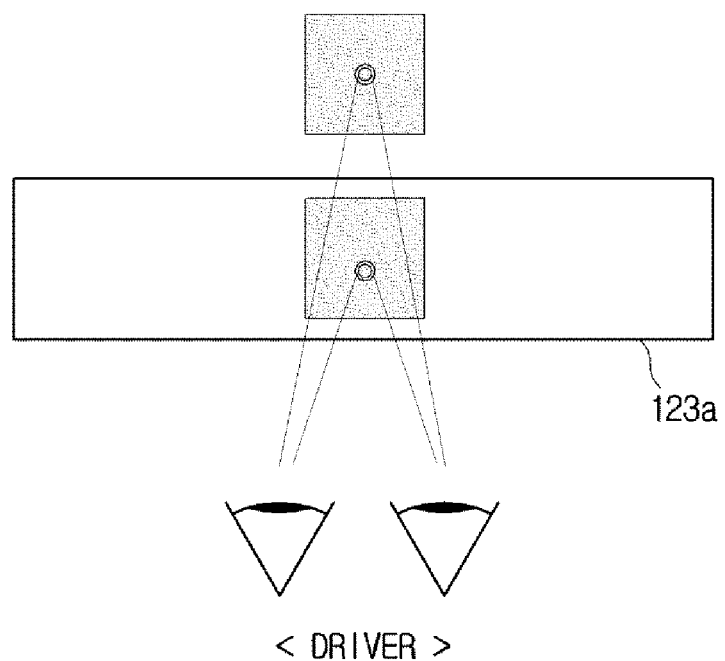
FIG. 16 is an exemplary view illustrating the output of image during the single-mode when the display apparatus pivots in accordance with an exemplary embodiment of the present invention.

FIG. 14 is an exemplary view illustrating an operation period of the first and second light source device during the single-mode in the display apparatus in accordance with an exemplary embodiment of the present invention, FIG. 15 is an exemplary view illustrating the output image during the single-mode in the display apparatus in accordance with an exemplary embodiment of the present invention, and FIG. 16 is an exemplary view illustrating the output of image during the single-mode when the display apparatus pivots in accordance with an exemplary embodiment of the present invention.

When the power is turned on, the display apparatus may check an image display mode (271).

The display apparatus may determine whether the checked image display mode is the multi-mode (272) and when it is determined that the checked image display mode is the multi-mode, the display apparatus may check a first function and a second function that is input to the second input. The display apparatus may check first view image information corresponding the checked first function and second view image information corresponding the checked second function (273).

The first function may be a function required by a driver and the second function may be a function required by a passenger.

For example, the first function may be the navigation function and the second function may be the broadcast function.

The display apparatus may check the reference clock signal, and turn on the first light source device 221 and turn off the second light source device 222 based on the checked reference clock signal. The display apparatus may determine whether a reference time is expired based on the reference clock signal, and when it is determined that the reference time is expired the display apparatus may turn off the first light source device 221 and turn on the second light source device 222.

The determination of whether the reference time is expired based on the reference clock signal may include determining whether a high signal of the reference clock signal is generated.

As illustrated in FIG. 9, the display apparatus may turn on the first light source device 221 at a time in which the high signal of the reference clock signal is generated. When the high signal is generated again while the first light source device 221 is turned on, the display apparatus may turn on the second light source device 222 and maintain the second light source device 222 in the ON operation until a next high signal is generated.

As mentioned above, the display apparatus may alternately turn on the first light source device 221 and the second light source device 222 at a time in which the high signal of the reference clock signal is generated.

The display apparatus may output the first view image information on the liquid crystal panel at the same time while turning on the first light source device 221, and the display apparatus may output the second view image information on the liquid crystal panel at the same time while turning on the second light source device 222 (274).

That is, the display apparatus may turn on the first light source device 221 at a signal of the odd-numbered period in the reference clock signal and output the first view image information. The display apparatus may turn on the second light source device 222 at a signal of the even-numbered period in the reference clock signal and output the second view image information.

A description thereof will be described with reference to FIG. 10A and FIG. 10B.

As illustrated in FIG. 10A, when the first light source device 221 is turned on and the second light source device 222 is turned off, light emitted from the first light source device 221 may be incident to the inside of the light guide plate 223, and a portion of the light incident to the inside of the light guide plate 223 may be emitted to the outside via a first inclined surface of the light guide portion 223c, wherein the emitted light may be toward the first view direction.

The display apparatus may allow the first view image to be output on the liquid crystal panel by operating the liquid crystal panel based on the first view image information, wherein the first view image may be seen in the first view direction by the light emitted from the backlight device.

As illustrated in FIG. 10B, when the second light source device 222 is turned on and the first light source device 221 is turned off, light emitted from the second light source device 222 may be incident to the inside of the light guide plate 223, and a portion of the light incident to the inside of the light guide plate 223 may be emitted to the outside via a second inclined surface of the light guide portion 223c, wherein the emitted light may be toward the second view direction.

The display apparatus may allow the second view image to be output on the liquid crystal panel by operating the liquid crystal panel based on the second view image information, wherein the second view image may be seen in the second view direction by the light emitted from the backlight device.

When outputting the image information, the liquid crystal panel may output a first frame (n11) among the first view image information during a single period of the reference clock signal, output a first frame (n21) among the second view image information during a next single period of the reference clock signal, output a second frame (n12) among the first view image information during a next single period of the reference clock signal, and output a second frame (n22) among the second view image information during a next single period of the reference clock signal. According to the above mentioned process, the display apparatus may perform the first and second function by outputting the first view image and the second view image.

As illustrated in FIG. 11, the driver placed in the first view direction may see the first image corresponding to the first function via the display apparatus, and the passenger placed in the second view direction may see the second image corresponding to the second function via the display apparatus.

As mentioned above, the display apparatus may output a time division multiple image.

Since the image is output using entire light emitted from the light source device, light loss may be prevented.

The display apparatus may output the first audio information corresponding to the first view image and the second audio information corresponding to the second view image via the sound output device.

During the multi-mode, the display apparatus may determine whether the display apparatus pivots (275), and when it is determined that the display apparatus maintains its current state the display apparatus may recognize the pose mode as the landscape mode and maintain the operation of the first and second light source device and the liquid crystal panel.

The determination of the pivot rotation may include determining whether the detection information detected by the second detector 265 is information corresponding to the pivot rotation of the display apparatus.

In addition, the determination of the pivot rotation may include determining whether the rotation information corresponding to the pivot rotation is input to the first input or the second input.

The rotation information may be information related to turning on and off the pivot rotation button.

When it is determined that the display apparatus pivots, the display apparatus may recognize the pose mode as the portrait mode and perform the coding of the first view image information and the second view image information to rotate the first view image and the second view image by 90 degrees (276).

The display apparatus may check the reference clock signal, and turn on the first light source device 221 and turn off the second light source device 222 based on the checked reference clock signal. The display apparatus may determine whether a reference time is expired based on the reference clock signal, and when it is determined that the reference time is expired the display apparatus may turn off the first light source device 221 and turn on the second light source device 222.

As mentioned above, the display apparatus may alternately turn on the first light source device 221 and the second light source device 222 based on a point of time or a period in which the high signal of the reference clock signal is generated (refer to FIG. 9).

The display apparatus may turn on the first light source device 221 at the same time while outputting the coded first view image information on the liquid crystal panel, and the display apparatus may turn on the second light source device 222 at the same time while outputting the coded second view image information on the liquid crystal panel (277).

That is, the display apparatus may turn on the first light source device 221 at a signal of the odd-numbered period in the reference clock signal, and output the first view image information. The display apparatus may turn on the second light source device 222 at a signal of the even-numbered period in the reference clock signal, and output the second view image information.

A description thereof will be described with reference to FIG. 12.

As illustrated in FIG. 12, when the first light source device 221 is turned on and the second light source device 222 is turned off, light emitted from the first light source device 221 may be incident to the inside of the light guide plate 223, and a portion of the light incident to the inside of the light guide plate 223 may be emitted to the outside via the first inclined surface of the light guide portion 223*c*, wherein the emitted light may be toward the third view direction.

The display apparatus may allow the coded first view image to be output on the liquid crystal panel by operating the liquid crystal panel based on the coded first view image information, wherein the coded first view image may be seen in the third view direction by the light emitted from the backlight device.

When the second light source device 222 is turned on and the first light source device 221 is turned off, light emitted from the second light source device 222 may be incident to the inside of the light guide plate 223, and a portion of the light incident to the inside of the light guide plate 223 may be emitted to the outside via the second inclined surface of the light guide portion 223*c*, wherein the emitted light may be toward the fourth view direction.

The display apparatus may allow the coded second view image to be output on the liquid crystal panel by operating the liquid crystal panel based on the coded second view image information, wherein the coded second view image may be seen in the fourth view direction by the light emitted from the backlight device.

The display apparatus may output the first audio information corresponding to the first view image and the second audio information corresponding to the second view image via the sound output device.

FIG. 13 is an exemplary view illustrating a case in which the display apparatus is the display provided in the cluster.

During the multi-mode and the portrait mode, the display of the cluster may allow the first view image to be output in the third view direction and allow the second view image to be output in the fourth view direction.

In the present time, a user may see the first image corresponding to the first function by focusing on the third view direction, which is the same direction or the upper direction with respect to a sight when a user gazes the front. The user may see the second image corresponding to the second function by lowering their sight to the fourth view direction, which is the lower direction.

When the view mode is the single-mode, the display apparatus may check the function input to the second input and check the image information corresponding to the are configured to checked function (278).

The display apparatus may turn on the first light source device 221 (279) and turn off the second light source device 222, and output the checked image information on the liquid crystal panel (280).

The display apparatus may output audio information corresponding to the image via the sound output device.

During the single-mode, the display apparatus may turn on both of the first light source device 221 and the second light source device 222 when the passenger is present.

Therefore, the passenger may be allowed to see the image corresponding to the input function.

During the single-mode, the display apparatus may reduce the output capacity to approximately 50% when turning on the both of the first and second light source device.

The display apparatus may recognize whether the passenger boards or not based on the information detected by the first detector 142, and recognize whether the passenger boards or not based on the view mode information input to the second input.

When the first view mode is input, the display apparatus may allow the image to be output in only the first view direction by turning on only the first light source device 221, when the second view mode is input the display apparatus may allow the image to be output in only the second view direction by turning on only the second light source device 222, and when the third view mode is input the display apparatus may allow the image to output in both of the first and second view direction by turning on both of the first light source device 221 and the second light source device 222.

The display apparatus may alternately turn on the first and second light source device 221 and 222, wherein the display apparatus may allow the image to be output when the first light source device 221 is turned on and allow the same image to be output when the second light source device 222 is turned on.

Referring to FIG. 14, during the single-mode and the third view mode, the display apparatus may turn on the first light source device 221 at a signal of the odd-numbered period in the reference clock signal and output the image information on the liquid crystal panel. The display apparatus may turn on the second light source device 222 at a signal of the even-numbered period in the reference clock signal and output the image information on the liquid crystal panel.

When outputting the image information, the liquid crystal panel may output a first frame (n1) among the image information during a single period of the reference clock signal in which the first light source device 221 is turned on, output a first frame (n1) among the image information during a next single period of the reference clock signal, in which the second light source device 222 is turned on, output a second frame (n2) among the image information during a next single period of the reference clock signal in which the first light source device 221 is turned on, and output a second frame (n2) among the image information during a next single period of the reference clock signal in which the second light source device 222 is turned on.

Accordingly, the same image may be output in the first and second view direction.

As illustrated in FIG. 15, when the first light source device 221 is turned on and the second light source device 222 is turned off, light emitted from the first light source device 221 may be incident to the inside of the light guide plate 223, and a portion of the light incident to the inside of the light guide plate 223 may be emitted to the outside via the first inclined surface of the light guide portion 223c, wherein the emitted light may be toward the first view direction.

The display apparatus may allow the image to be output on the liquid crystal panel by operating the liquid crystal panel based on the image information, wherein the image may be seen in the first view direction by the light emitted from the backlight device.

When the second light source device 222 is turned on and the first light source device 221 is turned off, light emitted from the second light source device 222 may be incident to the inside of the light guide plate 223, and a portion of the light incident to the inside of the light guide plate 223 may be emitted to the outside via the second inclined surface of the light guide portion 223c, wherein the emitted light may be toward the second view direction.

The display apparatus may allow the image to be output on the liquid crystal panel by operating the liquid crystal panel based on the image information, wherein the image may be seen in the second view direction by the light emitted from the backlight device.

During the single-mode, the display apparatus may determine whether the display apparatus pivots (281), and when it is determined that the display apparatus maintains its current state the display apparatus may recognize the pose mode as the landscape mode and maintain the operation of the first and second light source device and the liquid crystal panel.

When it is determined that the display apparatus pivots, the display apparatus may recognize the pose mode as the portrait mode and perform the coding of the image information to rotate the image by 90 degrees (282).

The display apparatus may allow the image that is rotated by 90 degrees to be output by operating the liquid crystal panel based on the coded image information (283).

The display apparatus may output audio information corresponding to the image via the sound output device.

When displaying the image in the portrait mode during the single-mode, the display apparatus may receive an input in a view direction to which an image is output, from a user.

The display apparatus may output the image in a predetermined view direction.

The display apparatus may allow the coded image to be displayed in at least one of the third view direction and the fourth view direction by controlling the ON operation of at least one of the first and second light source device and by controlling the liquid crystal panel.

FIG. 16 is an exemplary view illustrating a case in which the display apparatus is the display provided in the cluster.

During the single-mode and the portrait mode, the display of the cluster may allow the image to be output in the third view direction and allow the same image to be output in the fourth view direction.

In the present time, a user may see the image by raising their sight to the third view direction which is the upper direction with respect to the sight when a user gazes the front. The user may see the same image by lowering their sight to the fourth view direction, which is the lower direction.

Accordingly, during the single-mode, the user may select any one of the third view direction or the fourth view direction. In the present time, the display apparatus may allow the image to be displayed in the selected direction by turning on the light source device corresponding to the selected direction.

According to an embodiment, it may be possible to improve the convenience and satisfaction of the user of the vehicle.

As is apparent from the above description, according to the provided display apparatus, vehicle having the same, and method for controlling the same, it may be possible to output an image using the entire light emitted from the light source by outputting a time division multiple image using the light guide plate having a plurality of optical paths having different directions. Accordingly, it may be possible to prevent light loss.

In addition, according to the embodiment, since the barrier substrate and the lenticular lens are not required for the multiple images output, it may be possible to prevent the decrease of the refractive index caused by the adhesive layer of the barrier substrate, and it may be possible to prevent the interference in the multiple images caused by the lenticular lens.

It may be possible to display an image with a brightness that is brighter than the same output light source in a conventional manner, because the entire light of the light source is used.

Since the light loss of the light source is minimized, it may be possible to maintain the brightness of the display apparatus although the current applied from the light source is reduced, and thus it may be possible to minimize the power consumption of the display apparatus.

It may be possible to meet the needs of a plurality of users in the same area by displaying the time division multiple image by a single display apparatus.

It may be possible to perform the pivot rotation of the display apparatus so that a single user sees images related to a plurality of functions.

It may be possible to improve the quality and merchantability of the display apparatus configured for outputting the time division multiple image and the vehicle having the display apparatus, improving the satisfaction of the user and securing the competitiveness of the product.

For convenience in explanation and accurate definition in the appended claims, the terms "upper", "lower", "internal", "outer", "up", "down", "upwards", "downwards", "front", "back". "rear", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A display apparatus comprising:
a backlight device; and
a display panel separate from the backlight device and configured to output an image using light of the backlight device,
wherein the backlight device includes:
a first light source device configured to emit light;
a second light source device separate from the first light source device; and
a light guide plate disposed between the first light source device and the second light source device, and provided with a light guide portion configured to guide light in a first optical path when the light of the first light source device is incident and configured to guide light in a second optical path when the light of the second light source device is incident, and
wherein a controller is configured to alternately turn on the first light source device and the second light source device by a predetermined period, when a multi-mode is input, and configured to control outputting first view image information when the first light source device is turned on and second view image information when the second light source device is turned on.

2. The display apparatus of claim 1, wherein
the controller synchronizes an operation of the first light source device, an operation of the second light source device, and outputting the first and second view image information.

3. The display apparatus of claim 1, further comprising:
a case configured to accommodate the backlight device and the display panel; and
a rotation element provided in the case and configured to pivotally rotate the case,
wherein when the case is pivotally rotated by the rotation element, the controller is configured to control a coding of the first and second view image information to rotate a first view image and a second view image by 90 degrees.

4. The display apparatus of claim 3, wherein
the controller alternately turns on the first light source device and the second light source device by a predetermined period, wherein the controller is configured to control outputting the coded first view image information when the first light source device is turned on, and outputting the coded second view image information when the second light source device is turned on.

5. The display apparatus of claim 3, further comprising:
a detector configured to detect rotation information of the rotation element.

6. The display apparatus of claim 3, further comprising:
an input configured to receive an input of the rotation information of the rotation element.

7. The display apparatus of claim 3, further comprising;
an input configured to receive an operation command related to the pivot rotation; and
a driver configured to pivotally rotate the case by driving the rotation element based on the command of the controller.

8. The display apparatus of claim 1, further comprising:
a sound output device configured to output first audio information corresponding to the first view image information and second audio information corresponding to the second view image information.

9. The display apparatus of claim 1, wherein
when a single-mode is input, the controller turns on at least one of the first light source device and the second light source device and controls outputting image information.

10. The display apparatus of claim 1, wherein
the light guide portion comprises a plurality of patterns protruded from a surface adjacent to the display panel in a surface of the light guide plate.

11. The display apparatus of claim 10, wherein
the plurality of patterns is disposed with a predetermined distance on the surface of the light guide plate and protruded with a predetermined height from the surface of the light guide plate.

12. A vehicle comprising:
a body;
a display apparatus disposed between a driver seat and a passenger seat in the body and provided with a backlight device; and
a sound output device provided in the body and configured to output audio information corresponding to an image output on the display apparatus, as a sound,
wherein the backlight device comprises:
a first light source device configured to emit light;
a second light source device separate from the first light source device; and
a light guide plate disposed between the first light source device and the second light source device, and provided with a light guide portion configured to guide light in a first view direction when the light of the first light source device is incident and configured to guide light in a second view direction when the light of the second light source device is incident, and
wherein the display apparatus further includes a controller configured to alternately turn on the first light source device and the second light source device by a predetermined period, when a multi-mode is input, and configured to control outputting first view image information when the first light source device is turned on and second view image information when the second light source device is turned on.

13. The vehicle of claim 12, wherein
the sound output device outputs first audio information corresponding to the first view image information and second audio information corresponding to the second view image information.

14. The vehicle of claim 12, wherein
when a single-mode is input, the controller turns on at least one of the first light source device and the second light source device and controls outputting image information.

15. The vehicle of claim 12, wherein
the light guide portion includes a plurality of patterns protruded from a surface adjacent to the display panel in a surface of the light guide plate.

16. A vehicle comprising:
a body;
a cluster provided in the body; and
a display apparatus provided in the cluster and provided with a backlight device,
wherein the backlight device includes:
a first light source device configured to emit light;
a second light source device separate from the first light source device; and a light guide plate disposed between the first light source device and the second light source device, and provided with a light guide portion configured to guide light in a first view direction when the light of the first light source device is incident and configured to guide light in a second view direction when the light of the second light source device is incident.

17. The vehicle of claim 16, wherein the display apparatus further includes a controller configured to alternately turn on the first light source device and the second light source device by a predetermined period, when a multi-mode is input, and configured to control outputting first view image information when the first light source device is turned on and second view image information when the second light source device is turned on.

18. The vehicle of claim 17, wherein
when a single-mode is input, the controller turns on at least one of the first light source device and the second light source device, and controls outputting image information.

19. A method for controlling a display apparatus having an edge-type backlight device and a display panel, comprising:
alternately turning on a first light source device and a second light source device of the backlight device by a predetermined period, when a multi-mode is input;
outputting first view image information on the display panel when the first light source device is turned on; and
outputting second view image information on the display panel when the second light source device is turned on,
wherein turning on the first light source device includes allowing an optical path to be formed in a first view direction by a light guide portion provided in a light guide plate of the backlight device, and
turning on the second light source device includes allowing an optical path to be formed in a second view direction by the light guide portion provided in the light guide plate of the backlight device.

20. The method of claim 19, further comprising:
controlling a coding of the first and second view image information to rotate a first view image and a second view image by 90 degrees, when the display apparatus pivots.

21. The method of claim 19, further comprising
turning on at least one of the first light source device and the second light source device, when a single-mode is input, and outputting image information on the display panel.

* * * * *